US012428352B1

(12) United States Patent
Kang et al.

(10) Patent No.: US 12,428,352 B1
(45) Date of Patent: Sep. 30, 2025

(54) AEROGEL COMPOSITE

(71) Applicant: LG Chem, Ltd., Seoul (KR)

(72) Inventors: Taegyeong Kang, Daejeon (KR); Gyoeun Gu, Daejeon (KR); Kyoungshil Oh, Daejeon (KR); Hye Jin Kim, Daejeon (KR); Moo Kwang Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/909,438

(22) Filed: Oct. 8, 2024

(30) Foreign Application Priority Data

Mar. 27, 2024 (KR) .................. 10-2024-0042131

(51) Int. Cl.
  *C04B 35/82* (2006.01)
  *C04B 35/624* (2006.01)
  *C04B 38/00* (2006.01)

(52) U.S. Cl.
  CPC ........... *C04B 35/82* (2013.01); *C04B 35/624* (2013.01); *C04B 38/0045* (2013.01); *C04B 2235/3418* (2013.01); *C04B 2235/5232* (2013.01); *C04B 2235/77* (2013.01); *C04B 2235/9607* (2013.01)

(58) Field of Classification Search
  CPC .......................... C04B 35/82; C04B 38/0045
  See application file for complete search history.

(56) References Cited

U.S. PATENT DOCUMENTS

| 2,734,827 | A  | 2/1956 | Hooks |
| 7,560,062 | B2 | 7/2009 | Gould et al. |
| 10,759,666 | B2 | 9/2020 | Hindelang et al. |
| 11,577,490 | B2 | 2/2023 | Oikawa et al. |

(Continued)

FOREIGN PATENT DOCUMENTS

| CN | 101680128 B | 1/2013 |
| CN | 107140938 A | 9/2017 |

(Continued)

OTHER PUBLICATIONS

Shafi. Superhydrophobic, enhanced strength and thermal insulation silica aerogel/glass fber felt based on methyltrimethoxysilane precursor and silica gel impregnation. Journal of Porous Materials (2020) 27:495-502 (Year: 2020).*

(Continued)

*Primary Examiner* — Matthew E. Hoban
(74) *Attorney, Agent, or Firm* — Lerner David LLP

(57) ABSTRACT

The present disclosure relates to an aerogel composite having excellent insulation even when exposed to a high-temperature environment. An aerogel composite comprising: a fiber substrate; and aerogel including one or more pores, wherein a surface resistance at room temperature (23±2° C.) of the aerogel composite is $1\times10^{12}$ Ω/sq to $1\times10^{16}$ Ω/sq; a surface resistance measured after heating the aerogel composite at a temperature of 200° C. for 1 hour is $1\times10^{12}$ Ω/sq to $1\times10^{16}$ Ω/sq; and the aerogel composite has $R_{200}$, which is a real number of 0 to 4, in Equation 1 below:

$R_{200}=\log_{10}\{$(Surface resistance of aerogel composite after heating at 200° C. for 1 hour)/(Surface resistance of aerogel composite before heating)$\}$
[Equation 1].

19 Claims, 2 Drawing Sheets

(56) References Cited

U.S. PATENT DOCUMENTS

| | | |
|---|---|---|
| 2002/0094426 A1 | 7/2002 | Stepanian et al. |
| 2006/0125158 A1 | 6/2006 | Rouanet et al. |
| 2010/0143717 A1 | 6/2010 | Sakamoto et al. |
| 2016/0032584 A1 | 2/2016 | Doshi et al. |
| 2016/0369059 A1 | 12/2016 | Kotake et al. |
| 2017/0210092 A1 | 7/2017 | Rikleen et al. |
| 2017/0283269 A1 | 10/2017 | Kotake et al. |
| 2018/0029892 A1 | 2/2018 | Yu et al. |
| 2018/0086587 A1 | 3/2018 | Kim et al. |
| 2018/0134566 A1* | 5/2018 | Kim ................ F16L 59/026 |
| 2018/0244029 A1 | 8/2018 | Kim et al. |
| 2018/0313001 A1 | 11/2018 | Dempsey |
| 2018/0326700 A1 | 11/2018 | Kim |
| 2019/0062167 A1 | 2/2019 | Kim et al. |
| 2020/0108583 A1 | 4/2020 | Oikawa et al. |
| 2020/0215791 A1 | 7/2020 | Oh et al. |
| 2020/0378058 A1 | 12/2020 | Oikawa et al. |
| 2021/0016239 A1 | 1/2021 | Kim et al. |
| 2021/0155486 A1 | 5/2021 | Kang et al. |
| 2021/0163303 A1 | 6/2021 | Evans et al. |
| 2021/0309527 A1 | 10/2021 | Evans et al. |
| 2021/0363699 A1 | 11/2021 | Afshari et al. |
| 2021/0370636 A1 | 12/2021 | Tsuruta et al. |
| 2022/0098046 A1 | 3/2022 | Lee et al. |
| 2022/0195137 A1 | 6/2022 | Movahhed et al. |
| 2022/0204350 A1 | 6/2022 | Oh et al. |
| 2023/0050685 A1 | 2/2023 | Kim et al. |
| 2023/0331560 A1 | 10/2023 | Kim et al. |
| 2023/0348285 A1 | 11/2023 | Numrich et al. |

FOREIGN PATENT DOCUMENTS

| | | |
|---|---|---|
| CN | 106565268 B | 1/2020 |
| CN | 113939942 A | 1/2022 |
| CN | 115748088 A | 3/2023 |
| CN | 116154360 A | 5/2023 |
| CN | 116945715 A | 10/2023 |
| EP | 4056539 A1 | 9/2022 |
| JP | WO2017221687 A1 | 1/2019 |
| JP | WO2018163354 A1 | 12/2019 |
| JP | 2020060291 A | 4/2020 |
| JP | 2021036038 A | 3/2021 |
| JP | 2022529347 A | 6/2022 |
| JP | 7285085 B2 | 6/2023 |
| JP | 7352769 B2 | 9/2023 |
| JP | 7368327 B2 | 10/2023 |
| KR | 20050022986 A | 3/2005 |
| KR | 20070100738 A | 10/2007 |
| KR | 100909732 B1 | 7/2009 |
| KR | 20120116944 A | 10/2012 |
| KR | 101281689 B1 | 7/2013 |
| KR | 20130138275 A | 12/2013 |
| KR | 20150090320 A | 8/2015 |
| KR | 101654795 B1 | 9/2016 |
| KR | 20160125956 A | 11/2016 |
| KR | 20170060027 A | 5/2017 |
| KR | 101748532 B1 | 6/2017 |
| KR | 101752091 B1 | 6/2017 |
| KR | 20170098141 A | 8/2017 |
| KR | 20170132829 A | 12/2017 |
| KR | 20180033064 A | 4/2018 |
| KR | 101911188 B1 | 10/2018 |
| KR | 101928538 B1 | 12/2018 |
| KR | 101966406 B1 | 4/2019 |
| KR | 101993643 B1 | 6/2019 |
| KR | 20200073730 A | 6/2020 |
| KR | 20200095323 A | 8/2020 |
| KR | 102192354 B1 | 12/2020 |
| KR | 20210071508 A | 6/2021 |
| KR | 20210146798 A | 12/2021 |
| KR | 20220049841 A | 4/2022 |
| KR | 20220109454 A | 8/2022 |
| KR | 20220137360 A | 10/2022 |
| KR | 20220154727 A | 11/2022 |
| KR | 20220164499 A | 12/2022 |
| KR | 20230005300 A | 1/2023 |
| WO | 2017155311 A1 | 9/2017 |

OTHER PUBLICATIONS

Lakatos. Experimental verification of thermal properties of the aerogel blanket. Case Studies in Thermal Engineering 25 (2021) (Year: 2021).*

Emmerling, A. et al., "Small angle scattering and the structure of aeroels," Journal of Non-Crystalline Solids, Elsevier B.V., 1992, vol. 145, pp. 113-120.

Dai, Y. et al., "A Theoretical Model for the Effective Thermal Conductivity of Silica Aerogel Composites," Applied Thermal Engineering, Sep. 2017, vol. 128, pp. 1634-1645.

Zhao, J. et al., "A 3-D numerical heat transfer model for silica aerogels based on the porous secondary nanoparticle aggregate structure," Journal of Non-Crystalline Solids, May 2012, vol. 358, pp. 1287-1297.

Sangbae, J. et al., "Application os Silica Aerogel as an Interlayer Insulating Film," The Korean Ceramic Society, Ceramist, Dec. 2001, vol. 4, Issue 6, pp. 84-90.

Klochkov, A. et al., "Pulse NMR of 3He in Aerogel at temperature 1.5K," Journal of Physics, Conference Series, IOP Publishing Ltd, 150, 2009, 5 pages.

International Search Report for Application No. PCT/KR2024/015088 mailed Jan. 16, 2025. 3 pages (see p. 2-3, categorizing the cited references).

Woignier et al. (Mechanical Properties of Gel-Derived Materials, Journal of Sol-Gel Science and Technology, 2000) (Year: 2000).

International Search Report for Application No. PCT/KR2024/013053 mailed Dec. 19, 2024, 3 pages. [See p. 1, categorizing the cited references].

International Search Report for Application No, PCT/KR2025/003925 dated Jun. 30, 2025. 5 pages.

\* cited by examiner

AEROGEL COMPOSITE

CROSS-REFERENCE TO RELATED APPLICATION

This application claims priority to Korean Patent Application No. 10-2024-0042131 filed on Mar. 27, 2024, the content of which is incorporated by reference in its entirety.

BACKGROUND

The present disclosure relates to an aerogel composite and the application use thereof as a heat insulation material.

Aerogel is a super-porous, high specific surface area ($\geq 500$ m$^2$/g) material having a porosity of approximately 90.0% to 99.9% and a pore size in the range of 1 nm to 100 nm, and is a material having excellent properties of ultra-light weight/super-heat insulation/ultra-low dielectric, and the like. Accordingly, research on the development of aerogel materials as well as research on the application use thereof as transparent heat insulation materials and environmentally friendly high-temperature heat insulation materials, ultra-low dielectric thin films for highly integrated devices, catalysts and catalyst carriers, electrodes for supercapacitors, and electrode materials for seawater desalination have been actively conducted.

The biggest advantage of an aerogel is that it has super-insulation properties exhibiting thermal conductivity of 0.300 W/m·K or less, which is lower than that of an organic heat insulation material such as conventional Styrofoam.

In general, an aerogel is prepared by preparing hydrogel and alcogel from a silica precursor such as water glass and an alkoxysilane group (TEOS, TMOS, MTMS, and the like), and removing a liquid component inside the gel without destroying the microstructure.

Particularly, a hydrophobic silica aerogel blanket in which a hydrophobic silica aerogel is formed in a fiber is a functional heat insulation material which prevents corrosion by moisture, and is widely used in construction or industrial fields, but recently, it is also being applied as an insulation material for batteries in electric vehicles, and the like.

If an aerogel blanket is applied to a battery module as described above, the aerogel blanket is required to have insulation performance capable of insulating battery components, in addition to heat insulation properties. Although aerogel is an insulating material, if an aerogel blanket is applied inside a battery or inside a vehicle, the aerogel blanket is often exposed to a high temperature environment, in which case, the structure of the aerogel collapses, causing a problem of degradation in insulation properties of the aerogel blanket. Therefore, there is a demand for an aerogel blanket which not only has excellent insulation properties even at room temperature, but also can maintain excellent insulation properties even in a high-temperature environment.

SUMMARY

The present disclosure provides an aerogel composite capable of maintaining an excellent level of insulation even when exposed to a high-temperature environment.

However, the technical task to be achieved by the present disclosure is not limited to the aforementioned task, and other tasks that are not mentioned will be clearly understood by those skilled in the art from the following description.

In accordance with some aspects of the present disclosure, an aerogel composite includes a fiber substrate, and aerogel including one or more pores, wherein the surface resistance at room temperature (23±2° C.) of the aerogel composite is $1\times10^{12}$ Ω/sq to $1\times10^{16}$ f/sq, the surface resistance measured after heating the aerogel composite at a temperature of 200° C. for 1 hour is $1\times10^{12}$ Ω/sq to $1\times10^{16}$ Ω/sq, and the aerogel composite has $R_{200}$, which is a real number of 0 to 4, in Equation 1 below.

$$R_{200}=\log_{10}\{(\text{Surface resistance of aerogel composite after heating at 200° C. for 1 hour})/(\text{Surface resistance of aerogel composite before heating})\} \quad [\text{Equation 1}]$$

The volume resistance at room temperature (23±2° C.) of the aerogel composite may be $1\times10^{12}$ Ωcm to $1\times10^{16}$ Ωcm.

The dielectric breakdown strength at room temperature (23±2° C.) of the aerogel composite may be 3 kV/mm to 30 kV/mm.

The aerogel composite may have $R_{400}$, which is a real number of -1.3 to 0, in Equation 2 below.

$$R_{400}=\log_{10}\{(\text{Surface resistance of aerogel composite after heating at 400° C. for 1 hour})/(\text{Surface resistance of aerogel composite before heating})\} \quad [\text{Equation 2}]$$

The surface resistance measured after heating the aerogel composite at a temperature of 400° C. for 1 hour may be $1\times10^{11}$ Ω/sq to $1\times10^{15}$ Ω/sq.

The aerogel composite may have $R_{600}$, which is a real number of -2.6 to 0, in Equation 3 below.

$$R_{600}=\log_{10}\{(\text{Surface resistance of aerogel composite after heating at 600° C.})/(\text{Surface resistance of aerogel composite before heating})\} \quad [\text{Equation 3}]$$

The surface resistance measured after heating the aerogel composite at a temperature of 600° C. for 1 hour may be $1\times10^{10}$ Ω/sq to $1\times10^{14}$ Ω/sq.

The aerogel composite may have $R_{600/400}$, which is a real number of -1.8 to 1, in Equation 4 below.

$$R_{600/400}=\log_{10}\{(\text{Surface resistance of aerogel composite after heating at 600° C.})/(\text{Surface resistance of aerogel composite after heating at 400° C.})\} \quad [\text{Equation 4}]$$

The aerogel composite may have a moisture impregnation rate (wt %) of 4 wt % or less, which is represented by Equation 5 below.

$$\text{Moisture impregnation rate (wt \%)}=\{(\text{Weight of specimen after impregnation}-\text{Weight of specimen before impregnation})/(\text{Weight of specimen before impregnation})\}\times 100 \quad [\text{Equation 5}]$$

In Equation 5 above, the weight of a specimen after impregnation means the weight measured after impregnating an aerogel composite specimen in distilled water at 21±2° C. for 15 minutes.

In the aerogel composite, the fiber substrate and the aerogel may be included in a weight ratio of 1:0.35 to 2.

The volume ratio of aerogel including pores and the voids between discrete fibers per unit volume of the aerogel composite may be 85% to 98%.

The volume ratio of the fibers per unit volume of the aerogel composite may be 2% to 15%.

The volume ratio of the aerogel including pores and the voids between discrete fibers per unit volume of the aerogel composite after heating the aerogel composite at a temperature of 200° C. for 1 hour may be 0.8 times to 1.5 times the volume ratio of the aerogel including pores and the voids between discrete fibers per unit volume of the aerogel composite before the heating.

The aerogel may be silica aerogel.

The fiber substrate may be a glass fiber substrate.

The aerogel composite may have a density of 0.15 g/cm³ to 0.30 g/cm³.

In accordance with another aspect of the present disclosure, a heat insulation member includes the aerogel composite, and a support member positioned on at least one surface of both surfaces of the aerogel composite.

The surface resistance at room temperature (23±2° C.) of the heat insulation member may be $1\times10^{12}$ Ω/sq to $1\times10^{15}$ Ω/sq, and the volume resistance thereof may be $1\times10^{12}$ Ωcm to $1\times10^{16}$ Ωcm.

The dielectric breakdown strength at room temperature (23±2° C.) of the heat insulation member may be 3 kV/mm to 30 kV/mm.

BRIEF DESCRIPTION OF THE DRAWINGS

Aspects of the present disclosure can be understood in more detail from the following description taken in conjunction with the accompanying drawings, in which.

DETAILED DESCRIPTION

Figure 1:
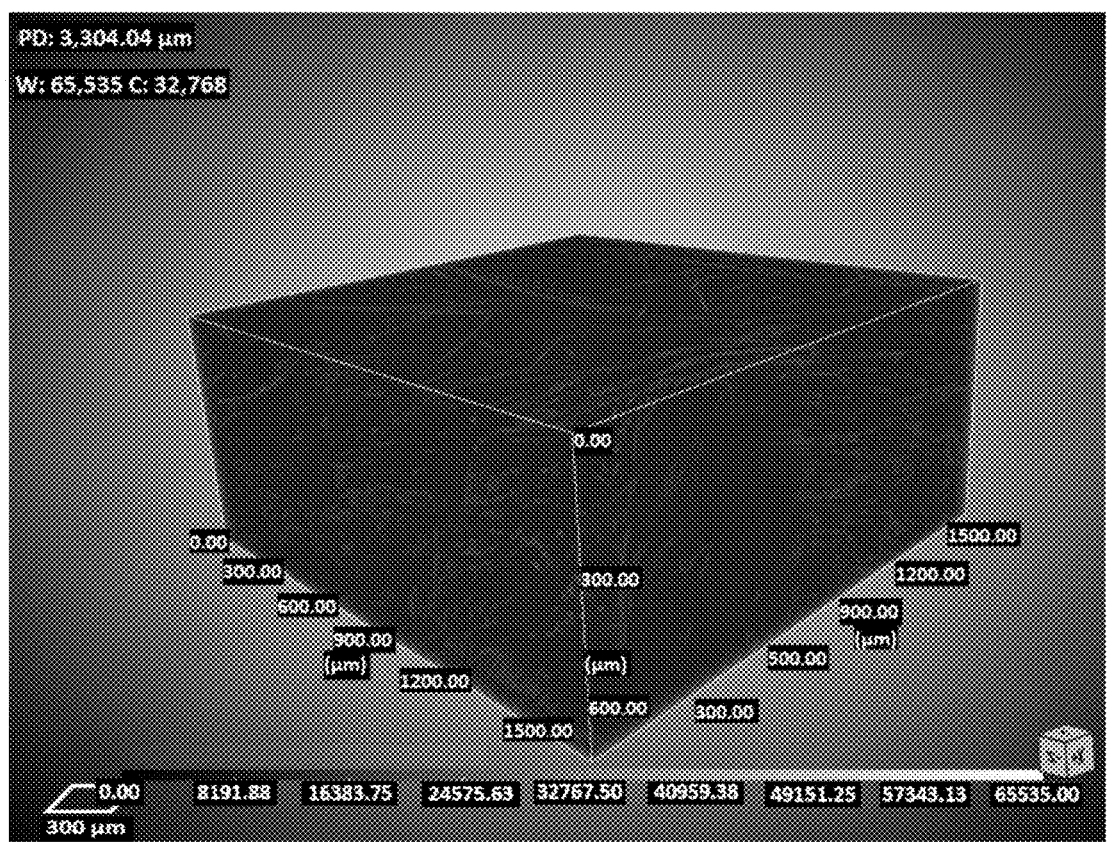
FIG. 1 illustrates an example process of performing in-situ XRM analysis on an aerogel composite in Experimental Example 1, and then setting and extracting a segmentation region for analyzing a volume occupancy ratio of fibers in the aerogel composite and the remaining portion thereof other than the fibers using Dragonfly software.

Hereinafter, the present disclosure will be described in more detail to facilitate understanding of the present disclosure. In this case, it will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In accordance with an aspect of the present disclosure, an aerogel composite includes a fiber substrate, and aerogel including one or more pores.

In the present disclosure, the "aerogel" includes a plurality of primary aerogel particles having a size of greater than approximately 0 nm and less than or equal to 10 nm, or greater than 0 nm and less than or equal to 5 nm, and a secondary aerogel particle formed by aggregation or combination of the above-described primary aerogel particles, and since a plurality of open pores are formed between the above-described primary aerogel particles and between the secondary aerogel particles to form an aggregate, the aerogel forms a three-dimensional network structure.

In the present disclosure, the aerogel may be inorganic silica aerogel formed from a silicon alkoxide-based compound or water glass as a precursor. In some aspects, the aerogel may be composed of silica, methylsilylated silica, dimethylsilylated silica, trimethylsilylated silica, or a mixture thereof. In some embodiments, the aerogel may be that at least a portion of $SiO_2$ present on the surface of a $SiO_2$ network structure has a bonding structure of Si—O—$SiO_2$($CH_3$), Si—O—SiO($CH_3$)$_2$, or Si—O—Si($CH_3$)$_3$. A specific process for producing silica aerogel will be described in detail below.

In the present disclosure, aerogel particles may be positioned on the fiber substrate, and in voids between neighboring fiber substrates. In the present disclosure, the "aerogel particles" are particles in the form of individual solid units constituting aerogel, and may include both primary aerogel particles having a size of greater than approximately 0 nm and less than or equal to 10 nm, or greater than 0 nm and less than or equal to 5 nm, preferably having a size of approximately 1 nm or less, and secondary aerogel particles formed by aggregation of the above-described particles. However, aerogel in an aerogel composite is mostly in the form of secondary aerogel particles or in the form in which the secondary aerogel particles are aggregated and combined, and there may be trace mixtures of primary aerogel particles that do not form secondary aerogel particles. The secondary aerogel particles may have an average particle diameter of approximately 5 nm to 2,000 nm, 5 nm to 1,000 nm, 5 nm to 500 nm, 5 nm to 100 nm, or 5 nm to 50 nm, but are not limited thereto. In the present disclosure, the above-described average particle size may be measured by any method known to those skilled in the art, such as scanning electron microscopy, dynamic light scattering, optical microscopy, or size exclusion, but the method is not limited thereto.

In the present disclosure, the aerogel may have a skeletal structure including mesopores, and may include micropores or macropores in addition to the mesopores. Here, the "mesopore" is a pore having an average pore diameter in the range of approximately 2 nm to approximately 50 nm, the "macropore" is a pore having an average pore diameter in the range of greater than approximately 50 nm, and the "micropore" is a pore having an average pore diameter in the range of less than approximately 2 nm. In the present disclosure, the aerogel may include mesopores of at least 50%, at least 60%, at least 70%, at least 80%, at least 90%, at least 95%, at least 96%, at least 97%, at least 98%, at least 99%, or 100% of the pore volume of the skeletal structure. In one aspect, the aerogel of the present disclosure may include mesopores. In one aspect, the aerogel of the present disclosure may include mesopores and micropores. In the present disclosure, the pore size may be measured by any means known to those skilled in the art, such as a gas adsorption experiment, mercury infiltration, capillary flow porometry, positron annihilation lifetime spectroscopy (PALS), or the like, but is not limited thereto.

In the present disclosure, the porosity of the aerogel may be 80% or greater, 85% or greater, 88% or greater, 89% or greater, 90% or greater, 91% or greater, 92% or greater, 93% or greater, 94% or greater, 95% or greater, 96% or greater, 97% or greater, 98% or greater, or 99% or greater, preferably 80% or greater, or 99.9% or less, but is not limited thereto.

The aerogel composite of the present disclosure has a structure in which at least some of a plurality of aerogel particles are dispersed, preferably combined, on the surface of a substrate including a fiber, and at the same time, has a structure in which at least some of the plurality of aerogel particles are dispersed, preferably positioned, in an empty space between discrete fibers in the substrate. In the present disclosure, examples of the above substrate may be discrete fibers, a film, a sheet, a net, a fiber, a porous body, a foam, a non-woven body, or a laminate of two or more layers thereof. In addition, depending on the application thereof, the substrate may have surface roughness formed or patterned on the surface thereof.

In the present disclosure, the fiber substrate may be polyester, polyolefin terephthalate, poly(ethylene) naphthalate, polycarbonate (e.g., rayon, nylon), cotton (e.g., Lycra® manufactured by DuPont), carbon (e.g., graphite), polyacrylonitrile (PAN), oxidized PAN, non-carbonized heat-treated PAN (such as those made of SGL carbon), a glass fiber-based material (S-glass, 901 glass, 902 glass, 475 glass, E-glass, etc.), a silica-based fiber such as Quartz (e.g., Quartzel® manufactured by Saint-Gobain), Q-Fiber® felt (manufactured by Jones Manville), Saffil (manufactured by Saffil), Durablanket (manufactured by Unifrax) and other silica fibers, Duraback® (manufactured by Carborundum), a polyaramid fiber such as Kevlar®, Nomex®, and Sontera® (all manufactured by DuPont), CONEX (manufactured by Taijin), a polyolefin such as Tyvek® (manufactured by DuPont), Dyneema (manufactured by DSM), Spectra® (manufactured by Honeywell), other polypropylene fibers such as Typar® and Xavan® (both manufactured by DuPont), a fluoropolymer such as PTFE under the trade name Teflon® (manufactured by DuPont), Goretex® (manufactured by W.L. GORE), a silicon carbide fiber such as NICALCON (manufactured by COI Ceramics), a ceramic fiber such as NEXTEL (manufactured by 3M), a ceramic paper, an acrylic polymer, wool, silk, hemp, leather, a suede fiber, a PBO fiber Zylong® (manufactured by Toyobo), a liquid crystal material such as VECTAN (manufactured by Hoechst), a cambrel fiber (manufactured by DuPont), polyurethane, polyamide, a wool fiber, a basalt fiber, boron, aluminum, iron, a stainless steel fiber and other thermoplastic resins such as PEEK, PES, PET, PEK, PPS, and the like, but any fiber may be used without limitation as long as it is a fiber which includes spaces or voids into which an aerogel may be easily inserted, thereby improving heat insulation performance. In some aspects, in the present disclosure, the fiber substrate may include a glass fiber. In some aspects, in the present disclosure, the fiber substrate may be made of a glass fiber, but is not limited thereto.

In the present disclosure, the thickness of the fiber substrate may be 0.5 nm to 20 mm, but is not limited thereto.

The aerogel composite provided in the present disclosure may have a rectangular parallelepiped shape in which a fiber substrate and aerogel may be mixed from an upper surface to a lower surface, but is not limited thereto.

In addition, at least a portion of the upper surface or lower surface, preferably the entire surface of the aerogel composite provided in the present disclosure may have a flat shape. Here, the "flat shape" means that irregularities are not formed by an intentional embossing or coating process. In the present disclosure, by forming the upper and lower surfaces of the aerogel composite to be flat as described above, it is possible to increase the ease of work in stacking a support member such as a sheet on the surface of the upper and lower surfaces in the future, and increase the adhesion retention rate of the support member. In addition, even if the aerogel composite itself is directly applied as a heat insulation member without a support member, it is preferable in terms of reducing frictional force with the surface of a device positioned adjacent thereto.

In the present disclosure, the thickness of the aerogel composite may be 0.05 mm to 20 mm, for example, 0.1 mm to 15 mm, 0.1 mm to 10 mm, or 0.1 mm to 5 mm, but is not limited thereto.

In the present disclosure, the density of the aerogel composite may be 0.05 $g/cm^3$ to 0.50 $g/cm^3$, 0.05 $g/cm^3$ to 0.35 $g/cm^3$, 0.05 $g/cm^3$ to 0.30 $g/cm^3$, 0.10 $g/cm^3$ to 0.30 $g/cm^3$, or 0.15 $g/cm^3$ to 0.30 $g/cm^3$, but is not limited thereto.

If the aerogel composite provided in the present disclosure includes the remaining portion other than the fibers, particularly the aerogel including pores and the voids between discrete fibers, where aerogel particles are not occupied, in a specific volume ratio or greater, the aerogel composite has excellent heat insulation properties, and sufficient surface modification is achieved in three-dimensionally distributed aerogel particles and aerogel particles positioned between the pores and the voids, and therefore, not only that the aerogel composite has excellent hydrophobic properties, and thus, has excellent insulation properties at room temperature, but also that the hydrophobic properties are maintained high even if the aerogel composite is exposed to a high-temperature environment, so that the insulation properties of the aerogel composite may be maintained at a high level.

Specifically, the volume ratio of the remaining portion other than the fibers per unit volume of the aerogel composite of the present disclosure, i.e., the aerogel including pores and the voids between discrete fibers, may be 85% or greater, 86% or greater, 87% or greater, 88% or greater, 89% or greater, or 90% or greater, and 98% or less, 97% or less, 96% or less, 95% or less, 94% or less, or 93% or less, and preferably, may be 85% to 98%, 88% to 95%, or 88% to 93%.

The volume ratio of the fibers per unit volume of the aerogel composite of the present disclosure may be 2% or greater, 3% or greater, 4% or greater, 5% or greater, 6% or greater, 7% or greater, 8% or greater, 9% or greater, or 10% or greater, and 15% or less, 14% or less, 13% or less, 12% or less, 11% or less, or 10% or less, and preferably, may be 2% to 15%, 5% to 12%, or 7% to 12%.

However, here, the unit volume of the aerogel composite refers to the volume of an aerogel composite in a rectangular parallelepiped shape with a width×lengthlength of 1 cm×1 cm. The unit volume of the aerogel composite is defined as the product of the width, length, and height(thickness) of the aerogel composite, assuming that any pores within the aerogel or voids between the discrete fibers, where aerogel particles do not fill, are occupied by an arbitrary material. The volume of fibers per unit volume of the aerogel composite refers to the total volume occupied by the individual fibers within the unit volume of the aerogel composite. The volume of the remaining portion excluding the fibers, per unit volume of the aerogel composite, includes the volumes of the aerogel containing pores and the voids between the discrete fibers, where the aerogel particles are not occupied. The volume of the pores and voids can be calculated by assuming that these pores and voids are evenly filled with an arbitrary material. The volume of the aerogel containing pores and the voids between the fibers per unit volume of the aerogel composite can be calculated by subtracting the volume of the fibers from the unit volume of the aerogel composite.

In the present disclosure, the above-described volume ratio of the voids and the aerogel including pores per unit volume of the aerogel composite may be obtained by randomly obtaining, from the aerogel composite, a total of five rectangular parallelepiped specimens with a width× length of 1 cm×1 cm and a thickness, which is the thickness of thickness of the aerogel composite, and then calculating an average value of volume ratios of the voids and the aerogel including pores per unit volume of the aerogel composite as measured from each specimen. At this time, the five specimens may be obtained by obtaining four specimens by positioning a position, which is spaced apart by 10 cm in a center direction from each corner of the aerogel composite prepared in a rectangular shape (e.g., which may have a size of 60 cm×12 cm, but is not limited thereto) prepared in a rectangular parallelepiped shape, at the exact center of each specimen, and obtaining one specimen by positioning the exact central portion of the aerogel composite at the exact center of a specimen.

In addition, in the present disclosure, the volume ratio of the aerogel including pores and the voids between discrete fibers per unit volume of the aerogel composite described above may be measured by using VERSA 520 equipment of ZEISS Co., and by measuring the volume ratio of the fibers and the remaining portion other than the fibers in a segmentation to be analyzed using Dragonfly software (version 2021.3). At this time, the size (width×length×height) of the segmentation to be analyzed is not specifically limited, and the segmentation may be set and extracted to each size or less of the unit volume. In some aspects, the segmentation may be set and extracted to a width×length×height of 1700 μm×1600 μm×500 μm. However, in the present specification, the above-described method is merely described as an example of a method for measuring the volume ratio of the aerogel including pores and the voids between discrete fibers per unit volume of the aerogel composite described above, and the method is not limited to the above-described method.

In addition, after heating the aerogel composite of the present disclosure at a temperature of 200° C. for 1 hour, the volume ratio of the remaining portion other than the fibers per unit volume of the heat-treated aerogel composite, i.e., the aerogel including pores and the voids between the fibers, may be 83% or greater, 84% or greater, 85% or greater, 86% or greater, 87% or greater, 88% or greater, 89% or greater, or 90% or greater, and 98% or less, 97% or less, 96% or less, 95% or less, 94% or less, or 93% or less, 92% or less, 91% or less, or 90% or less, and preferably, may be 83% to 98%, 85% to 95%, or 88% to 93%.

In addition, after heating the aerogel composite of the present disclosure at a temperature of 200° C. for 1 hour, the volume ratio of the fibers per unit volume of the heat-treated aerogel composite may be 2% or greater, 3% or greater, 4% or greater, 5% or greater, 6% or greater, 7% or greater, 8% or greater, 9% or greater, 10% or greater, 11% or greater, or 12% or greater, and 17% or less, 16% or less, 15% or less, 14% or less, 13% or less, 12% or less, 11% or less, or 10% or less, and preferably, may be 2% to 17%, 5% to 15%, or 7% to 12%.

After heating the aerogel composite provided in the present disclosure at a temperature of 200° C. for 1 hour, the volume ratio of the aerogel including pores and the voids between discrete fibers based on the unit volume of the aerogel composite may be 0.8 times to 1.5 times, 0.8 times to 1.3 times, 0.8 times to 1.2 times, 0.9 times to 1.2 times, or 0.9 times to 1.1 times the volume ratio of the aerogel including pores and the voids between discrete fibers based on the unit volume of the aerogel composite before heating.

In addition, the aerogel composite provided in the present disclosure includes a fiber substrate(fibers) and a hydrophobically modified aerogel in a specific weight ratio, other than the above-described volume ratio, and thus, may have high heat insulation together with excellent insulation.

Specifically, in the aerogel composite of the present disclosure, the fiber substrate and the aerogel may be included at a weight ratio of 1:0.35 to 2, preferably at a weight ratio of 1:0.375 to 2, or at a weight ratio of 1:0.4 to 1.

The surface resistance at room temperature (23±2° C.) of the aerogel composite of the present disclosure may be $1\times10^{11}$ Ω/sq or greater, or $1\times10^{12}$ Ω/sq or greater, and preferably, may be $1\times10^{12}$ Ω/sq to $1\times10^{16}$ Ω/sq, $1\times10^{12}$ to $5\times10^{15}$ Ω/sq, or $1\times10^{12}$ to $1\times10^{15}$ Ω/sq.

The volume resistance at room temperature (23±2° C.) of the aerogel composite of the present disclosure may be $1\times10^{11}$ Ωcm or greater, or $1\times10^{12}$ Ωcm or greater, and preferably, may be $1\times10^{12}$ Ωcm to $1\times10^{16}$ Ωcm, $1\times10^{12}$ to $1\times10^{15}$ Ωcm, or $1\times10^{12}$ to $5\times10^{14}$ Ωcm.

In the present disclosure, the surface resistance and the volume resistance were measured by applying a voltage of 1,000 V for 60 seconds to any one surface of both surfaces of an aerogel composite specimen by using a resistivity meter (Hiresta UX MCP-HT800, Mitsubishi Chemical Analytech).

The dielectric breakdown strength at room temperature (23±2° C.) of the aerogel composite of the present disclosure may be 3 kV/mm or greater, 4 kV/mm or greater, 5 kV/mm or greater, 6 kV/mm or greater, 7 kV/mm or greater, 8 kV/mm or greater, 9 kV/mm or greater, or 10 kV/mm or greater. The higher the value of the dielectric breakdown strength, the better the insulation of the aerogel composite, and the upper limit of the value is not specifically limited, but may be, for example, about 30 kV/mm or less, 25 kV/mm or less, 20 kV/mm or less, or 15 kV/mm or less.

In the present disclosure, the measurement of the dielectric breakdown strength was performed based on the ASTM D149 test method under the conditions of 23±2° C. and 45±5% R.H. using AC/DC withstand voltage test equipment (6CCE100-5/D149, Phenix Technologies).

In the present disclosure, the surface resistance, the volume resistance, and the dielectric breakdown strength measured from the aerogel composite may be obtained by randomly obtaining a total of 5 square specimens having 50 mm×50 mm size from the aerogel composite, and then calculating an average value of values measured from each specimen. At this time, the five specimens may be obtained by obtaining four specimens by positioning a position, which is spaced apart by 10 cm in a center direction from each corner of an aerogel composite prepared in a rectangular shape having a size of 60 cm×12 cm, at the exact center of a specimen, and by obtaining one specimen by positioning the exact central portion of the aerogel composite at the exact center of a specimen as well.

The aerogel composite provided in the present disclosure has excellent insulation properties in addition to excellent heat insulation properties and mechanical physical properties, and even when exposed for a long period of time at a temperature of 200° C. or higher, hydrophobic properties of aerogel on the surface of the aerogel and particularly inside the pores/voids are maintained high, and due to a high substitution rate of hydrophobic groups, there are fewer hydrophilic groups (—OH) on the surface, resulting in fewer structural changes such as pore contraction during the exposure to a high temperature, so that the insulation properties may be maintained at an excellent level without degradation even in a high-temperature environment.

Specifically, when heated at a temperature of 200° C. for 1 hour, the aerogel composite provided in the present disclosure is characterized by having improved insulation properties since the surface resistance is maintained or increased compared to that at room temperature.

More specifically, the aerogel composite provided in the present disclosure may satisfy Equation 1 below.

$$R_{200}=\log_{10}\{(\text{Surface resistance of aerogel composite after heating at 200° C.})/(\text{Surface resistance of aerogel composite before heating})\} \quad \text{[Equation 1]}$$

In Equation 1 above, the "surface resistance of the aerogel composite after heating at 200° C." is a surface resistance value measured for any one surface of both surfaces of the aerogel composite after a predetermined period of time, i.e., 24 hours or more, after the aerogel composite is heated at a temperature of 200° C. for 1 hour.

In addition, the "surface resistance of the aerogel composite before heating" is a surface resistance value measured for any one surface of both surfaces of the aerogel composite at room temperature (23±2° C.).

At this time, the surface resistance of the aerogel composite after heating may be measured for the same surface as the one surface of the aerogel composite measured for the surface resistance of the aerogel composite before heating, or may be measured for the other surface thereof, but preferably, may be measured for the same surface.

In addition, the $R_{200}$ may be a real number of 0 or greater, 5 or less, 4.5 or less, 4 or less, 3.5 or less, 3 or less, 2.5 or less, or 2 or less, and preferably, may be a real number of 0 to 4, a real number of 0 to 3.5, or a real number of 0 to 3.

The surface resistance measured after heating the aerogel composite of the present disclosure at a temperature of 200° C. for 1 hour may be $1\times10^{11}$ Ω/sq or greater, $1\times10^{12}$ Ω/sq or greater, or $1\times10^{13}$ Ω/sq or greater, and preferably, may be $1\times10^{12}$ Ω/sq to $1\times10^{16}$ Ω/sq, $1\times10^{13}$ to $1\times10^{16}$ Ω/sq, or $1\times10^{14}$ to $1\times10^{16}$ Ω/sq.

In addition, even when the aerogel composite provided in the present disclosure is heated at a temperature of 400° C. for 1 hour, the surface resistance is not significantly decreased compared to that at room temperature, and the insulation properties may be maintained at an excellent level without being significantly degraded due to a high temperature.

More specifically, the aerogel composite provided in the present disclosure may satisfy Equation 2 below.

$$R_{400}=\log_{10}\{(\text{Surface resistance of aerogel composite after heating at 400° C.})/(\text{Surface resistance of aerogel composite before heating})\} \quad \text{[Equation 2]}$$

In Equation 2 above, the "surface resistance of the aerogel composite after heating at 400° C." is a surface resistance value measured for any one surface of both surfaces of the aerogel composite after a predetermined period of time after the aerogel composite is heated at a temperature of 400° C. for 1 hour.

In addition, the $R_{400}$ may be a real number of −5 or greater, −4.5 or greater, −4 or greater, −3.5 or greater, −3 or greater, −2.5 or greater, −2 or greater, −1.9 or greater, −1.8 or greater, −1.7 or greater, −1.6 or greater, −1.5 or greater, −1.4 or greater, −1.3 or greater, −1.2 or greater, −1.1 or greater, or −1 or greater, and 0 or less, and preferably, may be a real number of −2 to 0, a real number of −1.7 to 0, a real number of −1.5 to 0, or a real number of −1.3 to 0.

The surface resistance measured after heating the aerogel composite of the present disclosure at a temperature of 400° C. for 1 hour may be $1\times10^{11}$ Ω/sq or greater, $1\times10^{12}$ Ω/sq or greater, or $1\times10^{13}$ Ω/sq or greater, and preferably, may be $1\times10^{11}$ Ω/sq to $1\times10^{15}$ Ω/sq, or $1\times10^{11}$ to $1\times10^{14}$ Ω/sq.

In addition, even when the aerogel composite provided in the present disclosure is heated at a high temperature of 600° C. for 1 hour, the surface resistance is not significantly decreased compared to that at room temperature, and the insulation properties may be maintained at an excellent level without being significantly degraded due to the high temperature.

The aerogel composite provided in the present disclosure may satisfy Equation 3 below.

$$R_{600}=\log_{10}\{(\text{Surface resistance of aerogel composite after heating at 600° C.})/(\text{Surface resistance of aerogel composite before heating})\} \quad \text{[Equation 3]}$$

In Equation 3 above, the "surface resistance of the aerogel composite after heating at 600° C." is a surface resistance value measured for any one surface of both surfaces of the aerogel composite after a predetermined period of time after the aerogel composite is heated at a temperature of 600° C. for 1 hour.

In addition, the $R_{600}$ may be a real number of −5 or greater, −4.5 or greater, −4 or greater, −3.5 or greater, −3 or greater, −2.9 or greater, −2.8 or greater, −2.7 or greater, −2.6 or greater, −2.5 or greater, −2.4 or greater, −2.3 or greater, −2.2 or greater, −2.1 or greater, or −2 or greater, and 0 or less, and preferably, may be a real number of −3 to 0, −a real number of −2.8 to 0, a real number of −2.7 to 0, or a real number of −2.6 to 0.

The surface resistance measured after heating the aerogel composite of the present disclosure at a temperature of 600° C. for 1 hour may be $1\times10^{10}$ Ω/sq or greater, $1\times10^{11}$ Ω/sq or greater, or $1\times10^{12}$ Ω/sq or greater, and preferably, may be $1\times10^{10}$ Ω/sq to $1\times10^{14}$ Ω/sq, $1\times10^{11}$ to $1\times10^{14}$ Ω/sq, or $1\times10^{11}$ to $1\times10^{13}$ Ω/sq.

Additionally, the surface resistance measured after heating the aerogel composite of the present disclosure at 600° C. for 1 hour does not show a significant decrease in surface resistance compared to the surface resistance measured after heating the aerogel composite at 400° C. for 1 hour.

The aerogel composite provided in the present disclosure may satisfy Equation 4 below.

$$R_{600/400}=\log_{10}\{(\text{Surface resistance of aerogel composite after heating at 600° C.})/(\text{Surface resistance of aerogel composite after heating at 400° C.})\} \quad \text{[Equation 4]}$$

In Equation 4 above, The $R_{600/400}$ may be a real number of −3 or greater, −2.5 or greater, −2 or greater, −1.9 or greater, −1.8 or greater, −1.7 or greater, −1.6 or greater, −1.5 or greater, −1.4 or greater, −1.3 or greater, −1.2 or greater, −1.1 or greater, or −1 or greater, and a real number of 1 less, and preferably, may be a real number of −1.8 to 1, or a real number of −1.7 to 1.

In the aerogel composite of the present disclosure, a moisture impregnation ratio (wt %) represented by Equation 5 below may be 5 wt % or less.

$$\text{Moisture impregnation rate (wt \%)}=\{(\text{Weight of specimen after impregnation}-\text{Weight of specimen before impregnation})/(\text{Weight of specimen before impregnation})\}\times100 \quad \text{[Equation 5]}$$

In Equation 5 above, the moisture impregnation rate may be calculated by floating a specimen of 100 mm×100 mm in size of the aerogel composite on distilled water at 21±2° C., and then placing a 6.4 mm mesh screen on top of the specimen to impregnate the specimen by sinking the same to 127 mm below the surface of the water, and after 15 minutes, removing the mesh screen and when the specimen rises to the surface, picking the specimen up with a clamp and hanging the specimen vertically for 60±5 seconds, and then measuring the weight increase rate by measuring the weight before and after the impregnation, respectively. Here, the lower the moisture impregnation rate, the higher the degree of hydrophobicity of the aerogel composite.

In the present disclosure, surface water repellency and cross-section water repellency for respectively evaluating the degree of hydrophobicity on the surface of the aerogel composite and the degree of hydrophobicity inside the aerogel composite may all be measured using Equation 5 above, and may be measured by varying specimens used at this time. Specifically, in the present disclosure, when measuring the moisture impregnation rate, a moisture impregnation rate measured using a relatively large aerogel composite specimen having a size of 100 mm×100 mm, which is similar to the size of a commercially available aerogel composite, is intended to represent water repellency on the surface of the aerogel composite. The low surface moisture impregnation rate described above means that the degree of hydrophobicity on the surface of the aerogel composite is high. In the present disclosure, the surface water repellency of the aerogel composite calculated through Equation 5 above may be 5 wt % or less, preferably 4 wt % or less.

In addition, in the present disclosure, when measuring the moisture impregnation rate, a moisture impregnation rate measured using an aerogel composite specimen cut to a size of a relatively small size, for example, a size of 10 mm×10 mm, is intended to represent water repellency on the cross-section of the aerogel composite. The low cross-section moisture impregnation rate described above means that the degree of hydrophobicity is high not only on the surface of the aerogel composite, but also inside the aerogel composite. In the present disclosure, the cross-section water repellency of the aerogel composite calculated through Equation 5 above may be 2 wt % or less, preferably 1.5 wt % or less.

In addition, the aerogel composite of the present disclosure may have high hydrophobicity even when heated at a high temperature of 200° C. In the present disclosure, the moisture impregnation rate measured according to Equation 5 above after heating the aerogel composite at 200° C. for 1 hour may be 10 wt % or less, preferably 5 wt % or less.

In addition, in the present disclosure, the aerogel composite may have a thermal conductivity at room temperature (23±2° C.) of 30.0 mW/mK or less, 25.0 mW/mK or less, or 20.0 mW/mK or less, and when in this range, there is an effect of securing the heat insulation of the aerogel composite to the maximum.

In the present disclosure, the aerogel blanket may have a thermal conductivity at a high temperature (150° C.) of 35.0 mW/mK or less, 30.0 mW/mK or less, or 25.0 mW/mK or less, and when in this range, there is an effect of securing the heat insulation of the aerogel composite to the maximum.

In the present disclosure, the aerogel composite has a compressive strength of 20 kPa to 80 kPa, 20 kPa to 70 kPa, 30 kPa to 80 kPa, 30 kPa to 70 kPa, 35 kPa to 80 kPa, or 35 kPa to 70 kPa at 10% deformation, and may have excellent mechanical strength. Here, the compressive strength may be measured by preparing a specimen according to the ASTM C165 standard.

In the present disclosure, the aerogel composite has a tensile strength of 30 N/cm$^2$ to 60 N/cm$^2$, 40 N/cm$^2$ to 55 N/cm$^2$, or 45 N/cm$^2$ to 55 N/cm$^2$, and may have excellent flexibility. Here, the tensile strength may be measured by preparing a specimen according to the ASTM D638 standard.

In the present disclosure, the density of the aerogel composite may be 0.05 g/cm$^3$ to 0.50 g/cm$^3$, 0.05 g/cm$^3$ to 0.35 g/cm$^3$, 0.05 g/cm$^3$ to 0.30 g/cm$^3$, 0.10 g/cm$^3$ to 0.35 g/cm$^3$, 0.10 g/cm$^3$ to 0.30 g/cm$^3$, 0.15 g/cm$^3$ to 0.35 g/cm$^3$, or 0.15 g/cm$^3$ to 0.30 g/cm$^3$, but is not limited thereto.

In the present disclosure, the aerogel composite may be generally formed by preparing a silica sol, impregnating a fiber substrate with the silica sol, and then performing gelation thereon, and drying the same. Hereinafter, each step will be described. However, the specific preparation processes or examples thereof described herein are not intended to be limited to any particular type of aerogel or preparation method thereof. The present disclosure may include any aerogel formed by any associated preparation method known to those skilled in the art.

Preparation of Silica Sol

In the present disclosure, a silica precursor composition may be used to prepare a silica sol.

In the present disclosure, the silica precursor composition may include water and/or a polar organic solvent in a silica precursor.

In the present disclosure, the silica precursor may be used without limitation as long as it is a precursor which may be used to form a silica aerogel, and for example, may be a silicon-containing alkoxide-based compound. Specifically, the silica precursor may be tetra alkyl silicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate. Among these, more specifically, in the case of the present disclosure, the silica precursor may be tetramethyl orthosilicate (TMOS), tetraethyl orthosilicate (TEOS), or a mixture thereof.

In addition, in the present disclosure, the silica precursor may be a water glass solution. Here, the water glass solution may be a diluted solution in which distilled water is added to water glass and then mixed therewith, and the water glass may be sodium silicate ($Na_2SiO_3$) which is an alkali silicate salt obtained by melting silicon dioxide ($SiO_2$) and alkali.

In addition, in the present disclosure, the silica precursor may include a pre-hydrolyzed TEOS (HTEOS). The HTEOS is an ethyl silicate oligomer material having a wide molecular weight distribution, and when synthesized into an oligomer form from a TEOS monomer, physical properties such as gelation time may be adjusted, and thus, may be easily applied according to a user's reaction conditions. In addition, there is an advantage in that reproducible physical properties of a final product may be created. The HTEOS may typically be synthesized by a condensation reaction of TEOS which has undergone a partial hydration step under acidic conditions. That is, the HTEOS is in the form of an oligomer prepared by condensing TEOS, wherein the oligomer is partially hydrated.

In the present disclosure, the silica precursor composition may further include silicate including a hydrophobic group. In the present disclosure, the type of the silicate including a hydrophobic group is not limited as long as it is an alkyl silane compound including an alkyl group inducing hydrophobization and a silane functional group capable of reacting with an —Si—O-functional group of a wet gel, but specific examples thereof may include one or more selected from the group consisting of methyltriethoxysilane (MTES), trimethylethoxysilane (TMES), trimethylsilanol (TMS), methyltrimethoxysilane (MTMS), dimethyldiethoxysilane (DMDEOS), ethyltriethoxysilane (ETES), and phenyltriethoxysilane (PTES), but are not limited thereto.

In the present disclosure, if the silicate including a hydrophobic group is included in the silica precursor composition, the silicate including a hydrophobic group and the tetraalkyl silicate may be included in a molar ratio (molar ratio of silicate including a hydrophobic group: tetraalkyl silicate) of 2:98 to 98:2, preferably at a molar ratio of 1:9 to 9:1. Within the above range, the strength and heat insulation performance of aerogel may be secured with high efficiency, and contraction may be prevented during drying, particularly during normal-pressure drying for removing residual moisture after supercritical drying, thereby preventing degradation in heat insulation performance.

In the present disclosure, the silica concentration of the silica precursor composition may be 10 kg/m$^3$ to 100 kg/m$^3$, 20 kg/m$^3$ to 80 kg/m$^3$, 30 kg/m$^3$ to 70 kg/m$^3$, 30 kg/m$^3$ to 60 kg/m$^3$, or 35 kg/m$^3$ to 45 kg/m$^3$, but is not limited thereto. In the present disclosure, the silica concentration is the concentration of the silica included in the silica precursor with respect to the silica precursor composition, and may be suitably adjusted by varying the contents of a silica precursor, an organic solvent, and water.

In the present disclosure, the silica precursor may be used in an amount such that the content of the silica included in the silica sol is to be 0.1 wt % to 30 wt %, but is not limited thereto. When the content of the silica satisfies the above range, it is preferable in terms of securing mechanical physical properties, the flexibility in particular, of the aerogel composite at an excellent level while having the effect of improving heat insulation.

In the present disclosure, the polar organic solvent may include an alcohol, and specific examples thereof may include a monohydric alcohol such as methanol, ethanol, isopropanol, and butanol, a polyhydric alcohol such as glycerol, ethylene glycol, propylene glycol, diethylene glycol, dipropylene glycol, and sorbitol, or a combination thereof, but other solvents as known to those skilled in the art may also be used without limitation. In the present disclosure, when considering the miscibility with water and an aerogel, the polar organic solvent may be a monohydric alcohol having 1 to 6 carbon atoms such as methanol, ethanol, isopropanol, and butanol, and may be, for example, ethanol.

In the present disclosure, the polar organic solvent may be used in an appropriate amount by those skilled in the art in consideration of the degree of hydrophobicity in an aerogel composite to be finally prepared while promoting a surface modification reaction.

In addition, in the present disclosure, in order to prepare a pre-hydrolyzed silica precursor when preparing the silica precursor composition, the silica precursor and water may be mixed and prepared at a molar ratio of 1:0.5 to 10, 1:1 to 8, or 1:3 to 6, but are not limited thereto.

In addition, in the present disclosure, when a pre-hydrolyzed silica precursor (for example, a pre-hydrolyzed TEOS) is included as a silica precursor when preparing the silica precursor composition, in order to satisfy the silica concentration, the pre-hydrolyzed silica precursor (for example, the pre-hydrolyzed TEOS) and an organic solvent may be mixed and prepared at a weight ratio of 1:0.5 to 10, and preferably, may be mixed and prepared at a weight ratio of 1:0.5 to 4, or 1:0.7 to 4, but are not limited thereto.

In the present disclosure, the weight ratio of the pre-hydrolyzed silica precursor and the organic solvent may be suitably adjusted within the above-described range such that the weight ratio of the fiber substrate with respect to the aerogel in the finally prepared aerogel composite is to be 1:0.35 to 2, 1:0.375 to 2, or 1:0.4 to 1.

In the present disclosure, the silica precursor composition may further include an acid catalyst, and specifically, may further include an acid catalyst when applying an alkoxy silane-based compound, which is not a hydrolysate, as a precursor. At this time, the acid catalyst may be used without limitation as long as it is an acid catalyst which allows the pH to be 3 or less, and as an example, a hydrochloric acid, a nitric acid, a sulfuric acid, a phosphoric acid, an oxalic acid, or an acetic acid may be used. At this time, the acid catalyst may be added in an amount which allows the pH of the sol to be 3 or less, and may be added in the form of an aqueous solution in which the acid catalyst is dissolved in an aqueous solvent.

In the present disclosure, the catalyst composition may include, as a base catalyst, an inorganic base such as sodium hydroxide or potassium hydroxide, or an organic base such as ammonium hydroxide. Specific examples thereof may include sodium hydroxide (NaOH), potassium hydroxide (KOH), calcium hydroxide (Ca(OH)$_2$), ammonia (NH$_3$), ammonium hydroxide (NH$_4$OH; ammonia water), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethyl amino) ethanol, 2-(methyl amino) ethanol, N-methyl diethanolamine, dimethylaminoethanol, diethylaminoethanol, nitrilotriethanol, 2-(2-aminoethoxy) ethanol, 1-amino-2-propanol, triethanolamine, monopropanolamine, dibutanolamine, pyridine, a combination thereof, or the like, but are not limited thereto.

In the present disclosure, the base catalyst may be included in an amount which allows the pH of the sol to be 5 to 9. If the pH of the sol is out of the above range, gelation may not be easily achieved or a gelation rate may be too low, so that processability may be degraded. In addition, since the base may be precipitated when introduced in a solid phase, it may be preferable that the base is added in a solution phase diluted by an aqueous solvent or the above-described organic solvent. At this time, the dilution ratio of the base catalyst and the organic solvent, specifically an alcohol, may be 1:4 to 1:100 based on a volume basis, but is not limited thereto.

In the present disclosure, in order to prepare the silica sol, the silica precursor composition and the catalyst composition may be mixed at a volume ratio of 1:0.01 to 10.0, 1:0.01 to 5.0, or 1:0.01 to 2.0, but is not limited thereto.

In addition, in the present disclosure, when preparing the silica sol, silica aerogel powder is added together with the above-described silica precursor to increase uniformity during gelation and to maintain high hydrophobicity at a high temperature. At this time, the aerogel powder is hydrophobic silica aerogel powder with a carbon content of 10 parts by weight to 12 parts by weight with respect to the total weight of the aerogel powder, and may be prepared by sequentially performing preparing a silica sol using an alkoxy silane such as tetraethylorthosilicate (TEOS), followed by gelling the silica sol, performing surface modification using a surface modifier such as an alkyltrichlorosilane such as methyltrichlorosilane, a dialkyldichlorosilane such as dimethyldichlorosilane, a trialkyl chlorosilane such as trimethyl chlorosilane, a symmetrical disiloxane such as hexamethyldisiloxane or hexaalkyldisiloxane, a trialkylalkoxysilane such as trimethyl ethoxysilane, or a silazane such as hexamethyldisilazane, and then performing drying.

In the present disclosure, the silica aerogel powder may be prepared through a process of preparing a silica sol using a silica precursor composition, gelling the silica sol, and if necessary, performing surface modification and then drying (supercritical drying and/or normal-pressure drying). Here, the composition of a silica precursor, a catalyst composition, and an organic solvent for preparing the silica sol, gelation conditions, and the like overlap those of the preparation process of the aerogel composite according to the present disclosure, and thus, detailed descriptions thereof will be omitted.

In the present disclosure, the average particle size of the aerogel powder may be 10 μm to 100 μm, preferably 10 μm to 60 μm, but is not limited thereto.

In the present disclosure, in order to achieve the above-described object, the aerogel powder may be added in an amount of 5 parts by weight to 30 parts by weight, preferably 5 parts by weight to 15 parts by weight, based on 100 parts by weight of silica included in the silica sol. If the addition amount of the aerogel powder is less than the above-described range, it is difficult to expect a desired effect, and if greater than the above-described range, the strength of the aerogel composite may be degraded.

In the present disclosure, if necessary, an additive may be further added to the silica sol. At this time, all known additives which may be added when preparing aerogel may be applied as the additive, and for example, an additive such as an opacifying agent and an additional flame retardant may be used.

In the present disclosure, the additive may be added in an amount of 0.1 wt % to 10 wt %, 0.1 wt % to 7 wt %, 0.5 wt % to 7 wt %, or 0.5 wt % to 5 wt % based on the silica content of the aerogel, but is not limited thereto.

Gelation of Silica Sol

In the present disclosure, after the silica sol is impregnated into the substrate, the silica sol may be subjected to gelation.

In the present disclosure, the impregnation process is a process of allowing a catalyzed silica sol to permeate into pores inside the substrate, and may be performed by introducing the catalyzed silica sol and the substrate into a reaction vessel, or may be performed by spraying the catalyzed silica sol on the substrate which is moving on a conveyor belt according to a roll-to-roll process. At this time, in order to improve the bonding between the substrate and the silica sol, the substrate may be lightly pressed down to be sufficiently impregnated. Thereafter, the substrate may be pressed to a predetermined thickness with a predetermined pressure to remove excess silica sol, so that drying time may be reduced.

In the present disclosure, the temperature of the silica sol in the reaction vessel may be 10° C. to 40° C., 20° C. to 40° C., 25° C. to 40° C., 30° C. to 40° C., or 35° C. to 45° C. When the temperature of the silica sol in the reaction vessel satisfies the above range, it is preferable in that the above-described viscosity range of the catalyzed sol may be more easily achieved, and even the retention time is relatively short, a desired level of viscosity range may be achieved.

In the present disclosure, the catalyzed silica sol may be impregnated into the substrate at a weight ratio of 1:0.35 to 2 (fiber substrate: catalyzed silica sol), a weight ratio of 1:0.35 to 1.5, or a weight ratio of 1:0.375 to 1, but is not limited thereto.

In the present disclosure, the silica sol impregnated into the substrate may be subjected to gelation simultaneously with the impregnation process of the silica sol or sequentially after the impregnation process.

In the present disclosure, the "gelation" may refer to a sol-gel reaction, and the "sol-gel reaction" may be forming a network structure from a silicon unit precursor material. Here, the network structure may be a planar mesh structure in which specific polygons having one or more types of atomic arrangement are linked to each other, or a structure in which specific polyhedrons share their vertices, edges, faces, and the like with each other to form a three-dimensional skeletal structure.

In the present disclosure, it is preferable that the gelation is performed under an ambient atmosphere temperature of 20° C. to 40° C., preferably 30° C. to 40° C., and more preferably 35° C. to 40° C., in terms of increasing the strength of the aerogel and the pore structure inside the aerogel.

In the present disclosure, the gelation time may be 1 minute to 120 minutes, 1 minute to 100 minutes, 1 minute to 60 minutes, 5 minutes to 60 minutes, 5 minutes to 40 minutes, 10 minutes to 40 minutes, 10 minutes to 30 minutes, or 10 minutes to 20 minutes, but is not limited thereto.

Aging of Gelled Wet Gel Composite

In the present disclosure, if necessary, an aging step may be further included, which is leaving the wet gel composite obtained by gelation as described above to stand at an appropriate temperature so as to achieve a complete chemical change. In the aging step, the network structure formed by the gelation may be more firmly formed, so that the mechanical stability of the aerogel composite may be improved.

In the present disclosure, the aging step may be performed by leaving the gelled wet gel composite to stand as it is at an appropriate temperature, or may be performed by adding a cross-linking-promoting compound.

In addition, in the present disclosure, the aging step may be performed by adding a solution in which a base catalyst such as sodium hydroxide (NaOH), potassium hydroxide (KOH), ammonium hydroxide (NH$_4$OH), triethylamine, or pyridine is diluted to a concentration of 1% to 10% in an organic solvent, in the presence of the wet gel composite. In this case, a Si—O—Si bonding in aerogel is induced to the maximum to allow the network structure of a silica gel to be firmer, so that there is an effect of facilitating the maintenance of the pore structure in a drying process be performed later. At this time, the organic solvent may be the alcohol described above, and specifically, may include ethanol.

In the present disclosure, the aging step may be performed by leaving the gelled wet gel composite to stand at a temperature of 30° C. to 80° C., 40° C. to 80° C., or 50° C. to 80° C. for 0.1 hours to 20 hours, 0.5 hours to 15 hours, 0.5 hours to 10 hours, 0.5 hours to 7 hours, or 1 hour to 5 hours to strengthen the pore structure, and within this range, it is possible to prevent an increase in production costs by preventing a loss of the solvent due to evaporation while preventing a decrease in productivity.

In addition, in the present disclosure, in the aging step, a mixed solution of an alkoxy silane-based compound and an alcohol may be added to provide an additional sol precursor source as well as unreacted sol to induce additional gelation in the silica gel network structure, thereby further strengthening the gel structure. At this time, the alkoxy silane-based compound modifier may be added in an amount of 100 vol % to 130 vol %, preferably 105 vol % to 115 vol %, with respect to the wet gel composite, but is not limited thereto.

In the present disclosure, the alkoxy silane-based compound may include one or more selected from the group consisting of tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, tetradodecyl orthosilicate, methyltrimethoxysilane (MTMS), methyltriethoxysilane (MTES), trimethylethoxysilane (TMES), trimethylsilanol (TMS), trimethylchlorosilane (TMCS), ethyltriethoxysilane (ETES), dimethyldiethoxysilane (DMDEOS), and phenyltriethoxysilane.

In addition, in the present disclosure, the alcohol may specifically be a monohydric alcohol such as methanol, ethanol, isopropanol, and butanol, or a polyhydric alcohol such as glycerol, ethylene glycol, propylene glycol, diethylene glycol, dipropylene glycol, and sorbitol, preferably a monohydric alcohol having 1 to 6 carbon atoms such as methanol, ethanol, isopropanol, and butanol, and may be, for example, ethanol, but is not limited thereto.

In the present disclosure, the aging step may be performed by performing primary aging of leaving the gelled wet gel composite at 30° C. to 80° C. for 0.1 hours to 5 hours to strengthen the pore structure, and then performing secondary aging at 30° C. to 80° C. for 0.1 hours to 20 hours, 0.5 hours to 15 hours, 0.5 hours to 10 hours, 0.5 hours to 7 hours, or 1 hour to 5 hours, in the presence of a mixed solution of an alkoxy silane compound and an alcohol.

In the present disclosure, the aging step may be performed in a separate reaction vessel after recovering the gelled wet gel composite, or may be performed inside the reaction vessel in which the gelation step has been performed.

Surface Modification of Aged Wet Gel Composite

The present disclosure includes a surface modification step of hydrophobizing the surface of the wet gel composite obtained by gelation as described above or the surface of the aged wet gel composite in the presence of a surface modifier.

In the present disclosure, as the surface modifier, a compound which hydrophobizes the surface of a wet gel may be applied without limitation, which may be, for example, a silane-based compound, a siloxane-based compound, a silanol-based compound, a silazane-based compound, or a combination thereof. Specific examples thereof may be a silane-based compound such as trimethylchlorosilane (TMCS), dimethyldimethoxysilane, dimethyldiethoxysilane, methyltrimethoxysilane (MTMS), methyltriethoxysilane (MTES), trimethylethoxysilane (TMES), vinyltrimethoxysilane, ethyltriethoxysilane, phenyltriethoxysilane, phenyltrimethoxysilane, tetraethoxysilane, dimethyldichlorosilane, and 3-aminopropyltriethoxysilane, a siloxane-based compound such as polydimethyl siloxane, polydiethyl siloxane, and octamethyl cyclotetra siloxane, a silanol-based compound such as trimethylsilanol, triethylsilanol, triphenyl silanol, and t-butyldimethylsilanol, a silazane-based compound such as 1,2-diethyldisilazane, 1,1,2,2-tetramethyldisilazane, 1,1,3,3-tetramethyldisilazane, 1,1,1,2,2,2-hexamethyldisilazane (HMDS), 1,1,2,2-tetraethyldisilazane, and 1,2-diisopropyldisilazane, or a combination thereof, but are not limited thereto.

In the present disclosure, the surface modifier may be used in a solution phase diluted in an organic solvent. Here, the organic solvent may be an alcohol (an organic solvent), and at this time, the surface modifier may be diluted to 1 vol % to 15 vol % based on the total volume of the diluted solution.

In addition, in the present disclosure, the surface modifier may be added in an amount of 0.01 vol % to 90 vol % with respect to the wet gel composite for a sufficient surface modification effect, but is not limited thereto.

In the present disclosure, the surface modification step may be performed at a temperature of 50° C. to 90° C. or 50° C. to 80° C. for 1 hour to 24 hours, but is not limited thereto.

Drying (or Drying and Surface Modification)

In the present disclosure, a drying step of drying the wet gel composite to obtain an aerogel composite may be included.

In the present disclosure, the drying is performed as a process of removing only the solvent while maintaining the pore structure of the aged gel, and may be performed, for example, by supercritical drying or normal-pressure drying.

In the present disclosure, the supercritical drying process is performed using supercritical carbon dioxide, and for example, may be performed by placing the aged wet gel composite in a supercritical drying reactor, filling the reactor with $CO_2$ in a liquid state, performing a solvent replacement process of replacing an alcohol solvent inside the wet gel with $CO_2$, followed by raising the temperature to a temperature of 40° C. to 70° C. at a predetermined temperature increase rate, for example, a rate of 0.1° C./min to 1° C./min, and then maintaining a pressure equal to or higher than the pressure at which carbon dioxide becomes supercritical, for example, a pressure of 100 bar to 150 bar, thereby maintaining the supercritical state of carbon dioxide for a predetermined period of time, specifically, 20 minutes to 1 hour. In general, carbon dioxide becomes supercritical at a temperature of 31° C., and a pressure of 73.8 bar. After the predetermined temperature and the predetermined pressure at which carbon dioxide becomes supercritical are maintained for 2 hours to 12 hours, more specifically, 2 hours to 6 hours, the pressure is gradually removed to complete the supercritical drying process, thereby producing an aerogel composite, but the present disclosure is not limited thereto.

In the present disclosure, the pressure of an extract solution discharged from a supercritical extractor used during supercritical drying is lowered to a range of 45 bar to 50 bar, thereby lowering the temperature of the extract solution to a temperature of 30° C. or lower, so that a process of inducing the precipitation of ammonium carbonate or ammonium hydrochloride may not be included.

In addition, in the present disclosure, the normal-pressure drying process may be performed according to a typical method such as hot air drying or IR drying at a temperature of 70° C. to 200° C. and under a normal pressure (1±0.3 atm), but is not limited thereto.

However, the present disclosure may include not only a method for drying the surface-modified wet gel composite, but also a method for selectively performing surface modification during supercritical drying of the aged wet gel composite.

In the present disclosure, if surface modification is performed during supercritical drying as described above, a surface modifier may be introduced when the final solvent extraction rate is 60 wt % or greater, 70 wt % or greater, or 80 wt % or greater after the supercritical drying. Since the surface modifier is introduced when the solvent extraction rate in a supercritical extractor falls within the above-described range, the aerogel composite may have excellent hydrophobicity, and particularly, an aerogel composite with excellent hydrophobicity retention even under a high-temperature environment may be prepared.

Here, the "solvent extraction rate" is a ratio of the amount of solvent recovered from a lower portion of an extractor in the supercritical drying step relative to the total amount of solvent included in the wet gel composite, which may be calculated by Equation 6 below.

Solvent extraction rate (%)=[(Amount of solvent discharged and recovered from extractor)/ (Amount of solvent in *wet gel* composite introduced into extractor)×100 (%)     [Equation 6]

In Equation 6 above, the weight of the solvent discharged and recovered from the extractor is the weight of the solvent obtained from an extracted solvent separator after drying, and the total amount of the solvent included in the wet gel composite is the difference between the weight of the aerogel composite after the drying and the weight of the wet gel composite before the drying.

In the present disclosure, as the surface modifier, a compound which hydrophobizes the surface of a wet gel may be applied without limitation, which may be, for example, a silane-based compound, a siloxane-based compound, a silanol-based compound, a silazane-based compound, or a combination thereof. Specific examples thereof may be a silane-based compound such as trimethylchlorosilane (TMCS), dimethyldimethoxysilane, dimethyldiethoxysilane, methyltrimethoxysilane (MTMS), methyltriethoxysilane (MTES), trimethylethoxysilane (TMES), vinyltrimethoxysilane, ethyltriethoxysilane, phenyltriethoxysilane, phenyltrimethoxysilane, tetraethoxysilane, dimethyldichlorosilane, and 3-aminopropyltriethoxysilane, a siloxane-based compound such as polydimethyl siloxane, polydiethyl siloxane, and octamethyl cyclotetra siloxane, a silanol-based compound such as trimethylsilanol, triethylsilanol, triphenyl silanol, and t-butyldimethylsilanol, a silazane-based compound such as 1,2-diethyldisilazane, 1,1,2,2-tetramethyldisilazane, 1,1,3,3-tetramethyldisilazane, 1,1,1,2,2,2-hexamethyldisilazane (HMDS), 1,1,2,2-tetraethyldisilazane, and 1,2-diisopropyldisilazane, or a combination thereof, but are not limited thereto.

In the present disclosure, the surface modifier may be added in an amount of 1 part by weight to 20 parts by weight, preferably 5 parts by weight to 15 parts by weight, based on 100 parts by weight of wet gel, but is not limited thereto. Here, the weight of the wet gel refers to the weight of the wet gel itself, excluding the weight of the fiber substrate.

In the present disclosure, the solvent used in the supercritical drying may be the solvent previously used in the preparation of the wet gel composite, and may include water and an organic solvent. In addition, the organic solvent may specifically be an alcohol, and at this time, the alcohol may be a monohydric alcohol such as methanol, ethanol, isopropanol, and butanol, or a polyhydric alcohol such as glycerol, ethylene glycol, propylene glycol, diethylene glycol, dipropylene glycol, and sorbitol, and any one thereof or a mixture of two or more thereof may be used. Among the above, when considering the miscibility with water and aerogel, the alcohol may be a monohydric alcohol having 1 to 6 carbon atoms such as methanol, ethanol, isopropanol, and butanol, and preferably, may be ethanol.

In addition, the solvent may include an organic solvent in an amount of 85 wt % to 95 wt % and water in an amount of 5 wt % to 15 wt %.

In addition, in the present disclosure, when the wet gel composite is introduced into the supercritical extractor during the supercritical drying, it is preferable that the wet gel composite is introduced to be 50 vol % or greater based on 100 vol % of the volume of the supercritical extractor because an environment may be created in which all the remaining solvent may be converted to a supercritical state when the surface modifier is added later.

In the present disclosure, it is preferable that the silica sol preparation step, the impregnation step, the drying step including the surface modification described above are designed such that the volume ratio of the fibers per unit volume of an aerogel composite prepared after final drying is to be 2% to 17%, 5% to 15%, or 7% to 12%, the volume ratio of the aerogel including pores and the voids between fibers as the remaining portion other than the fibers is to be 83% to 98%, 85% to 95%, or 88% to 93%, and additionally, a fiber substrate and aerogel are to be included at a weight ratio of 1:0.35 to 2, 1:0.375 to 2, or 1:0.4 to 1. In an aerogel composite, it is preferable that fibers, voids, and aerogel including pores are included in the volume ratio described above to achieve excellent heat insulation as well as excellent insulation, and also excellent hydrophobicity even inside the pores or voids, resulting in maintaining the insulation high even at a high temperature.

As such, the aerogel composite provided in the present disclosure has excellent heat insulation, and thus, may exhibit excellent heat blocking ability when applied as an insulation material to a battery module of an electric vehicle, or the like, and also has excellent insulation properties, ensuring that an insulation state between a battery and other devices, or between battery cells within a battery module is maintained.

In accordance with an aspect of the present disclosure, a heat insulation member includes the aerogel composite provided in the present disclosure.

In the present disclosure, the heat insulation member may include the above-described aerogel composite, and a support member positioned on at least one surface of both surfaces of the aerogel composite.

In the present disclosure, the support member may be, for example, a film-like support member, a sheet-like support member, a foil-like support member, a porous support member, and the like.

In the present disclosure, the film-like support member is formed by molding a polymer raw material into a thin film, and may be an organic film made of polyethylene terephthalate (PET), polyester, polycarbonate (PC), polyimide (PI), polyethylene naphthalate (PEN), polyether ether ketone (PEEK), polyarylate (PAR), polycylicolefin (PCO), polynorbornene, polyethersulphone (PES), cycloolefin polymer (COP), or the like, a glass film, and the like (also includes a metal-deposited film).

In the present disclosure, the sheet-like support member is formed by molding an organic, inorganic, or metallic fibrous raw material, and examples thereof may include paper, a non-woven fabric (including a glass mat), an organic fiber fabric, glass cloth, and the like.

In the present disclosure, the foil-like support member is formed by molding a metal raw material into a thin film, and examples thereof may include an aluminum foil, a copper foil, and the like.

In the present disclosure, the porous support member has a porous structure made of an organic, inorganic, or metal raw material, and examples thereof may include a porous organic material (e.g., polyurethane foam), a porous inorganic material (e.g., a zeolite sheet), a porous metal material (e.g., a porous metal sheet, a porous aluminum sheet), and the like.

In the present disclosure, the support member may be a single layer, or may have a multi-layered structure of two or more layers.

In the present disclosure, the thickness of the support member is not particularly limited, and may be, for example, 0.1 μm to 100 μm, or 1 μm to 50 μm.

In addition, in the present disclosure, a pressure-sensitive adhesive layer or an adhesive layer may be further included between an exposed surface of the aerogel composite and the support member.

In the present disclosure, the pressure-sensitive adhesive layer or the adhesive layer may include an acrylic pressure-sensitive adhesive, a polyurethane pressure-sensitive adhesive, an olefin pressure-sensitive adhesive, an SBR rubber pressure-sensitive adhesive, or a silicone pressure-sensitive adhesive, but is not limited thereto.

In the present disclosure, the pressure-sensitive adhesive layer or the adhesive layer is not particularly limited, and may be, for example, 1 μm to 100 μm, or 10 μm to 50 μm.

Although the heat insulation member provided in the present disclosure includes the above-described aerogel composite having excellent insulation properties, and may further include a support member on at least one surface of both surfaces of the aerogel composite, the surface resistance at room temperature (23±2° C.) may be $1 \times 10^{11}$ Ω/sq or greater, or $1 \times 10^{12}$ Ω/sq or greater, and preferably, may be $1 \times 10^{12}$ Ω/sq to $1 \times 10^{15}$ Ω/sq, $1 \times 10^{12}$ to $5 \times 10^{14}$ Ω/sq, or $1 \times 10^{12}$ to $1 \times 10^{14}$ Ω/sq.

In addition, the volume resistance at room temperature (23±2° C.) of the heat insulation member of the present disclosure may be $1 \times 10^{11}$ Ωcm or greater, or $1 \times 10^{12}$ Ωcm or greater, and preferably, may be $1 \times 10^{12}$ Ωcm to $1 \times 10^{16}$ Ωcm, $1 \times 10^{12}$ to $1 \times 10^{15}$ Ωcm, or $1 \times 10^{12}$ to $1 \times 10^{14}$ Ωcm.

In addition, the heat insulation member of the present disclosure maintains the dielectric breakdown strength at 3 kV/mm or greater, 3.5 kV/mm or greater, 4 kV/mm or greater, 5 kV/mm or greater, 6 kV/mm or greater, 7 kV/mm or greater, 8 kV/mm or greater, 9 kV/mm or greater, or 10 kV/mm or greater, and thus, has suitable insulation properties to be applied to a battery module of an electric vehicle and the like. The higher the value of the dielectric breakdown strength, the better the insulation of the heat insulation member, and the upper limit of the value is not specifically limited, but may be, for example, about 30 kV/mm or less, 25 kV/mm or less, 20 kV/mm or less, or 15 kV/mm or less.

In some aspects, the heat insulation member of the present disclosure includes the aerogel composite provided in the present disclosure, and a film-like support member made of PET positioned on at least one surface of both surfaces of the aerogel composite, and may have surface resistance at room temperature (23±2° C.) of $1 \times 10^{12}$ to $1 \times 10^{14}$ Ω/sq, volume resistance of $1 \times 10^{12}$ to $1 \times 10^{14}$ Ωcm, and dielectric breakdown strength of 3.5 kV/mm to 20 kV/mm, but is not limited thereto.

As described above, the aerogel composite provided in the present disclosure has excellent insulation properties, and thus, may have high insulation even when a support member is stacked on both surfaces of the aerogel composite.

Hereinafter, the present disclosure will be described in detail with reference to the following examples. However, the following examples are illustrative of the present disclosure, and the contents of the present disclosure are not limited by the following Examples.

EXAMPLES

[Preparation Example 1] Preparation of Aerogel Powder

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, hydrochloric acid was added such that the pH of the silica precursor solution was to be 3 or less and stirred for 2 hours or more to prepare a hydrated TEOS solution. Ethanol having a weight ratio of 1:1.67 with respect to the hydrated TEOS solution was added to prepare a silica sol. A base catalyst solution (5 wt % of NaOH aqueous solution) having a volume ratio of 99:1 with respect to the obtained silica sol was added to prepare a catalyzed sol. The catalyzed sol was placed in a container to be subjected to gelation. To gelled wet gel, 90 vol % of a solution (2 vol %) prepared as a surface modifier by diluting trimethylethoxysilane(TMES) in ethanol was added based on the volume of the wet gel, and then surface modification was performed thereon for 12 hours at a temperature of 75° C. At this time, in order to increase the surface modification efficiency, the wet gel in a monolith form may be cut into pieces with a size of several centimeters, and then subjected to the surface modification. After the surface modification was completed, the wet gel was placed in a 70 L supercritical extractor, and $CO_2$ was continuously injected thereto at 28° C. and 70 bar for 10 minutes at a rate of 70 L/min. Thereafter, the temperature inside the extractor was raised to 50° C. over the course of 1 hour and 20 minutes, and upon reaching 50° C. and 150 bar, $CO_2$ was continuously injected thereto for 20 minutes at a rate of 5 L/min. At this time, the ethanol was recovered through the bottom of a separator. After 20 minutes of resting, supercritical drying was performed by continuously injecting $CO_2$ at a rate of 5 L/min over the course of 20 minutes. Thereafter, $CO_2$ was vented over the course of 2 hours, resulting in preparing silica aerogel. The prepared silica aerogel was pulverized using a ZM 200 ultra centrifugal mill by RETSCH Co. to prepare hydrophobic aerogel powder classified to have an average particle size in the range of 10 μm to 100 μm.

[Example 1-1] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, hydrochloric acid was added such that the pH of the silica precursor solution was to be 3 or less and stirred for 2 hours or more to prepare a hydrated TEOS solution. Ethanol having a weight ratio of 1:1.67 with respect to the hydrated TEOS solution was added to prepare a silica sol. Thereafter, the prepared aerogel powder was added to the prepared silica sol in an amount of 15 parts by weight based on 100 parts by weight of silica in the silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber substrate (glass fiber mat, 3 mm) was impregnated with the catalyzed sol at a volume ratio of 1:1, such that the weight ratio of the fiber: aerogel was to be 60:40. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 40° C. To wet gel composite, 90 vol % of a solution (2 vol %) prepared as a surface modifier by diluting trimethylethoxysilane(TMES) in ethanol was added based on the volume of the wet gel composite, and then surface modification was performed thereon for 12 hours at a temperature of 75° C. After the surface modification was completed, the wet gel composite was placed in a 70 L supercritical extractor and $CO_2$ was continuously injected thereto at 28° C. and 70 bar for 10 minutes at a rate of 70 L/min. Thereafter, the temperature inside the extractor was raised to 50° C. over the course of 1 hour and 20 minutes, and upon reaching 50° C. and 150 bar, $CO_2$ was continuously injected thereto for 20 minutes at a rate of 5 L/min. At this time, the ethanol was recovered through the bottom of a separator. After 20 minutes of resting, supercritical drying was performed by continuously injecting $CO_2$ at a rate of 5 L/min over the course of 20 minutes. Thereafter, $CO_2$ was vented over the course of 2 hours, resulting in preparing a silica aerogel composite having a density of about 0.200 g/cc.

[Example 1-2] Preparation of Aerogel Composite

Trimethylethoxysilane (TMES) and TEOS were mixed in a molar ratio of 1:9 to prepare a silica precursor composition. The silica precursor composition and water were mixed in a molar ratio of 1:10, and ethanol having a weight ratio of 1:3 with respect to the silica precursor composition was added thereto to prepare a silica sol. In order to facilitate hydrolysis, hydrochloric acid was added such that the pH of the silica sol was to be 3 or less and then the mixture was stirred for 6 hours or more. A base catalyst solution (10 wt % of NaOH aqueous solution) having a volume ratio of 99:1 with respect to the silica sol was added to prepare a catalyzed silica sol. After filling the catalyzed sol in an impregnation tank, a fiber substrate (glass fiber mat, 3 mm) was impregnated with the catalyzed sol at a volume ratio of 1:1. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 40° C. To wet gel composite, 90 vol % of a solution (2 vol %) prepared as a surface modifier by diluting trimethylethoxysilane(TMES) in ethanol was added based on the volume of the wet gel composite, and then surface modification was performed thereon for 12 hours at a temperature of 75° C. After the surface modification was completed, the wet gel composite was placed in a 70 L supercritical extractor and $CO_2$ was continuously injected thereto at 28° C. and 70 bar for 10 minutes at a rate of 70 L/min. Thereafter, the temperature inside the extractor was raised to 50° C. over the course of 1 hour and 20 minutes, and upon reaching 50° C. and 150 bar, $CO_2$ was continuously injected thereto for 20 minutes at a rate of 5 L/min. At this time, the ethanol was recovered through the bottom of a separator. After 20 minutes of resting, supercritical drying was performed by continuously injecting $CO_2$ at a rate of 5 L/min over the course of 20 minutes. Thereafter, $CO_2$ was vented over the course of 2 hours, resulting in preparing a silica aerogel composite having a density of about 0.220 g/cc.

[Example 1-3] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, hydrochloric acid was added such that the pH of the silica precursor solution was to be 3 or less and then the mixture stirred for 2 hours or more to prepare a hydrated TEOS solution. Ethanol having a weight ratio of 1:0.73 with respect to the hydrated TEOS solution was added to prepare a silica sol. Thereafter, the prepared aerogel powder was added to the prepared silica sol in an amount of 10 parts by weight based on 100 parts by weight of silica in the silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber substrate (glass fiber mat, 3 mm) was impregnated with the catalyzed sol at a volume ratio of 1:1. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 35° C. The prepared wet gel composite was put into a supercritical extractor, and then the temperature was raised to 70° C. and the pressure was raised to 150 bar, and the raised temperature was maintained for 20 minutes. Thereafter, supercritical carbon dioxide was continuously injected for 20 minutes to extract the solvent, which was left at rest (left to stand) for 20 minutes. After repeating the supercritical carbon dioxide injection and the resting one more time, and continuously injecting the supercritical carbon dioxide for the third time, hexamethyldisilazane (HMDS) was introduced all at one in an amount of 8 parts by weight based on 100 parts by weight of the wet gel. When the hexamethyldisilazane was introduced, the solvent extraction rate was 75 wt %. Thereafter, the resting state was maintained for 20 minutes, and then the supercritical carbon dioxide was continuously injected. Thereafter, the pressure was reduced to normal pressure and the supercritical drying was completed. At this time, the supercritical drying took a total of 4 hours. Thereafter, additional normal-pressure drying was performed in an oven at 150° C. to prepare an aerogel composite having a density of about 0.240 g/cc.

[Example 1-4] Preparation of Aerogel Composite

Trimethylethoxysilane (TMES) and TEOS were mixed in a molar ratio of 1:9 to prepare a silica precursor composition. The silica precursor composition and water were mixed in a molar ratio of 1:10, and ethanol having a weight ratio of 1:2 with respect to the silica precursor composition was added thereto to prepare a silica sol. In order to facilitate hydrolysis, hydrochloric acid was added such that the pH of the silica sol was to be 3 or less and then the mixture was stirred for 6 hours or more. A base catalyst solution (10 wt % of NaOH aqueous solution) having a volume ratio of 99:1 with the silica sol was added to prepare a catalyzed silica sol. After filling the catalyzed sol in an impregnation tank, a fiber substrate (glass fiber mat, 3 mm) was impregnated with the catalyzed sol at a volume ratio of 1:1. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 35° C. The prepared wet gel composite was put into a supercritical extractor, and then the temperature was raised to 70° C. and the pressure was raised to 150 bar, and the raised temperature was maintained for 20 minutes. Thereafter, supercritical carbon dioxide was continuously injected for 20 minutes to extract the solvent, which was left at rest (left to stand) for 20 minutes. After repeating the supercritical carbon dioxide injection and the resting one more time, and continuously injecting the supercritical carbon dioxide for the third time, hexamethyldisilazane (HMDS) was introduced all at once in an amount of 10 parts by weight based on 100 parts by weight of the wet gel. When the hexamethyldisilazane was introduced, the solvent extraction rate was 80 wt %. Thereafter, the resting state was maintained for 20 minutes, and then the supercritical carbon dioxide was continuously injected. Thereafter, the pressure was reduced to normal pressure and the supercritical drying was completed. At this time, the supercritical drying took a total of 4 hours. Thereafter, additional normal-pressure drying was performed in an oven at 150° C. to prepare n silica aerogel composite having a density of about 0.240 g/cc.

[Example 1-5] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, hydrochloric acid was added such that the pH of the silica precursor solution was to be 3 or less and then the mixture stirred for 2 hours or more to prepare a hydrated TEOS solution. Ethanol having a weight ratio of 1:2.7 with respect to the hydrated TEOS solution was added to prepare a silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber substrate (glass fiber mat, 3 mm) was impregnated with the catalyzed sol at a volume ratio of 1:1. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 35° C. Thereafter, the gelled wet gel composite was added with 109 vol % of a solution as an aging solution, which was obtained by diluting 2.4 wt % of trimethylethoxysilane (TMES) in ethanol, based on the volume of the wet gel composite to be aged at a temperature of 75° C. for 1 hour. The aged wet gel composite was put into a supercritical extractor, and then the temperature was raised to 70° C. and the pressure was raised to 150 bar, and the raised temperature was maintained for 20 minutes. Thereafter, supercritical carbon dioxide was continuously injected for 20 minutes to extract the solvent, which was left at rest (left to stand) for 20 minutes. After repeating the supercritical carbon dioxide injection and the resting one more time, and continuously injecting the supercritical carbon dioxide for the third time, hexamethyldisilazane (HMDS) was introduced all at once in an amount of 6 parts by weight based on 100 parts by weight of the wet gel. When the hexamethyldisilazane was introduced, the solvent extraction rate was 75 wt %. Thereafter, the resting state was maintained for 20 minutes, and then the supercritical carbon dioxide was continuously injected. Thereafter, the pressure was reduced to normal pressure and the supercritical drying was completed. At this time, the supercritical drying took a total of 4 hours. Thereafter, additional normal-pressure drying was performed in an oven at 150° C. to prepare n silica aerogel composite having a density of about 0.180 g/cc.

[Example 1-6] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, hydrochloric acid was added such that the pH of the silica precursor solution was to be 3 or less and stirred for 2 hours or more to prepare a hydrated TEOS solution. Ethanol having a weight ratio of 1:2.7 with respect to the hydrated TEOS solution was added to prepare a silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber substrate (glass fiber mat, 3 mm) was impregnated with the catalyzed sol at a volume ratio of 1:1. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 35° C. After the gelation was completed, stabilization was performed at room temperature (25° C.) for 10 minutes, and then primary aging was performed in an oven at 70° C. for 50 minutes. Thereafter, the gelled wet gel composite was added with 109% of a solution, which was prepared by diluting 2.9 wt % of methyltriethoxysilane (MTES) in ethanol with a water content of 10 wt %, based on the volume of the wet gel composite to be subjected to secondary aging in an oven at 75° C. for 1 hour. The aged wet gel composite was put into a supercritical extractor, and then the temperature was raised to 70° C. and the pressure was raised to 150 bar, and the raised temperature was maintained for 20 minutes. Thereafter, supercritical carbon dioxide was continuously injected for 20 minutes to extract the solvent, which was left at rest (left to stand) for 20 minutes. After repeating the supercritical carbon dioxide injection and the resting one more time, and continuously injecting the supercritical carbon dioxide for the third time, hexamethyldisilazane (HMDS) was introduced all at once in an amount of 9 parts by weight based on 100 parts by weight of the wet gel. When the hexamethyldisilazane was introduced, the solvent extraction rate was 75 wt %. Thereafter, the resting state was maintained for 20 minutes, and then the supercritical carbon dioxide was continuously injected. Thereafter, the pressure was reduced to normal pressure and the supercritical drying was completed. At this time, the supercritical drying took a total of 4 hours. Thereafter, additional normal-pressure drying was performed in an oven at 150° C. to prepare n silica aerogel composite having a density of about 0.180 g/cc.

[Example 1-7] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, hydrochloric acid was added such that the pH of the silica precursor solution was to be 3 or less and then the mixture stirred for 2 hours or more to prepare a hydrated TEOS solution. Ethanol having a weight ratio of 1:3 with respect to the hydrated TEOS solution was added to prepare a silica sol. Thereafter, the prepared aerogel powder was added to the prepared silica sol in an amount of 10 parts by weight based on 100 parts by weight of silica in the silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber substrate (glass fiber fiber mat, 3 mm) was impregnated with the catalyzed sol at a volume ratio of 1:1. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 35° C. The prepared wet gel composite was put into a supercritical extractor, and then the temperature was raised to 70° C. and the pressure was raised to 150 bar, and the raised temperature was maintained for 20 minutes. Thereafter, supercritical carbon dioxide was continuously injected for 20 minutes to extract the solvent, which was left at rest (left to stand) for 20 minutes. After repeating the supercritical carbon dioxide injection and the resting one more time, and continuously injecting the supercritical carbon dioxide for the third time, hexamethyldisilazane (HMDS) was introduced all at once in an amount of 8 parts by weight based on 100 parts by weight of the wet gel. When the hexamethyldisilazane was introduced, the solvent extraction rate was 80 wt %. Thereafter, the resting state was maintained for 20 minutes, and then the supercritical carbon dioxide was continuously injected. Thereafter, the pressure was reduced to normal pressure and the supercritical drying was completed. At this time, the supercritical drying took a total of 4 hours. Thereafter, additional normal-pressure drying was performed in an oven at 150° C. to prepare n silica aerogel composite having a density of about 0.174 g/cc.

[Example 1-8] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, hydrochloric acid was added such that the pH of the silica precursor solution was to be 3 or less and then the mixture stirred for 2 hours or more to prepare a hydrated TEOS solution. Ethanol having a weight ratio of 1:3.8 with respect to the hydrated TEOS solution was added to prepare a silica sol. Thereafter, the prepared aerogel powder was added to the prepared silica sol in an amount of 10 parts by weight based on 100 parts by weight of silica in the silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber substrate (glass fiber mat, 3 mm) was impregnated with the catalyzed sol at a volume ratio of 1:1. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 35° C. The prepared wet gel composite was put into a supercritical extractor, and then the temperature was raised to 70° C. and the pressure was raised to 150 bar, and the raised temperature was maintained for 20 minutes. Thereafter, supercritical carbon dioxide was continuously injected for 20 minutes to extract the solvent, which was left at rest (left to stand) for 20 minutes. After repeating the supercritical carbon dioxide injection and the resting one more time, and continuously injecting the supercritical carbon dioxide for the third time, hexamethyldisilazane (HMDS) was introduced all at once in an amount of 10 parts by weight based on 100 parts by weight of the wet gel. When the hexamethyldisilazane was introduced, the solvent extraction rate was 80 wt %. Thereafter, the resting state was maintained for 20 minutes, and then the supercritical carbon dioxide was continuously injected. Thereafter, the pressure was reduced to normal pressure and the supercritical drying was completed. At this time, the supercritical drying took a total of 4 hours. Thereafter, additional normal-pressure drying was performed in an oven at 150° C. to prepare n silica aerogel composite having a density of about 0.165 g/cc.

[Comparative Example 1-1] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, hydrochloric acid was added such that the pH of the silica precursor solution was to be 3 or less and then the mixture stirred for 2 hours or more to prepare a hydrated TEOS solution. Ethanol having a weight ratio of 1:1.67 with respect to the hydrated TEOS solution was added to prepare a silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber (glass fiber mat, 3 mm) as a substrate was impregnated with the catalyzed sol at a volume ratio of 1:1. The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 30° C. The prepared wet gel composite was placed in a 70 L supercritical extractor, and $CO_2$ was continuously injected thereto at 28° C. and 70 bar for 10 minutes at a rate of 70 L/min. Thereafter, the temperature inside the extractor was raised to 50° C. over the course of 1 hour and 20 minutes, and upon reaching 50° C. and 150 bar, $CO_2$ was continuously injected thereto for 20 minutes at a rate of 5 L/min. At this time, the ethanol was recovered through the bottom of a separator. After 20 minutes of resting, supercritical drying was performed by continuously injecting $CO_2$ at a rate of 5 L/min over the course of 20 minutes. Thereafter, $CO_2$ was vented over the course of 2 hours, resulting in preparing a silica aerogel composite having a density of about 0.200 g/cc.

[Comparative Example 1-2] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, hydrochloric acid was added such that the pH of the silica precursor solution was to be 3 or less and then the mixture stirred for 2 hours or more to prepare a hydrated TEOS solution. Ethanol having a weight ratio of 1:5 with respect to the hydrated TEOS solution was added to prepare a silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber substrate (glass fiber mat, 3 mm) was impregnated with the catalyzed sol at a volume ratio of 1:1. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. A surface modifier solution prepared by mixing hexamethyldisilazane (HMDS) and ethanol in a volume ratio of 1:19 was added to wet gel composite at 90 vol %, and then surface-modification was performed thereon at 70° C. for 6 hours to prepare a hydrophobic silica wet gel composite. The prepared wet gel composite was placed in a 70 L supercritical extractor, and $CO_2$ was continuously injected thereto at 28° C. and 70 bar for 10 minutes at a rate of 70 L/min. Thereafter, the temperature inside the extractor was raised to 50° C. over the course of 1 hour and 20 minutes, and upon reaching 50° C. and 150 bar, $CO_2$ was continuously injected thereto for 20 minutes at a rate of 5 L/min. At this time, the ethanol was recovered through the bottom of a separator. After 20 minutes of resting, supercritical drying was performed by continuously injecting $CO_2$ at a rate of 5 L/min over the course of 20 minutes. Thereafter, $CO_2$ was vented over the course of 2 hours, resulting in preparing a silica aerogel composite having a density of about 0.156 g/cc.

[Comparative Example 1-3] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, hydrochloric acid was added such that the pH of the silica precursor solution was to be 3 or less and then the mixture stirred for 2 hours or more to prepare a hydrated TEOS solution. Ethanol having a weight ratio of 1:6 with respect to the hydrated TEOS solution was added to prepare a silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber substrate (glass fiber mat, 3 mm) was impregnated with the catalyzed sol at a volume ratio of 1:1. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. The prepared wet gel composite was put into a supercritical extractor, and then the temperature was raised to 70° C. and the pressure was raised to 150 bar, and the raised temperature was maintained for 20 minutes. Thereafter, supercritical carbon dioxide was continuously injected for 20 minutes to extract the solvent, which was left at rest (left to stand) for 20 minutes. After repeating the supercritical carbon dioxide injection and the resting one more time, and continuously injecting the supercritical carbon dioxide for the third time, hexamethyldisilazane (HMDS) was introduced all at once in an amount of 3 parts by weight based on 100 parts by weight of the wet gel. When the hexamethyldisilazane was introduced, the solvent extraction rate was 60 wt %. Thereafter, the resting state was maintained for 20 minutes, and then the supercritical carbon dioxide was continuously injected. Thereafter, the pressure was reduced to normal pressure and the supercritical drying was completed. At this time, the supercritical drying took a total of 4 hours. Thereafter, additional normal-pressure drying was performed in an oven at 150° C. to prepare n silica aerogel composite having a density of about 0.150 g/cc.

[Comparative Example 1-4] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, an acid was added such that the pH of the silica precursor solution was to be 3 or less and then the mixture stirred for 2 hours or more to prepare a hydrated TEOS solution. Ethanol having a weight ratio of 1:3.8 with respect to the hydrated TEOS solution was added to prepare a silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber substrate (glass fiber mat, 3 mm) was impregnated with the catalyzed sol at a volume ratio of 1:1. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 20° C., which is slightly lower than room temperature. The wet gel composite was added with 80 vol % of a solution (2 vol %) as a surface modifier, which was obtained by diluting trimethylethoxysilane(TMES) in ethanol, based on the volume of the wet gel composite, and then was subjected to surface modification at a temperature of 75° C. for 6 hours. After the surface modification was completed, the wet gel composite was placed in a 70 L supercritical extractor and $CO_2$ was continuously injected thereto at 28° C. and 70 bar for 10 minutes at a rate of 70 L/min. Thereafter, the temperature inside the extractor was raised to 50° C. over the course of 1 hour and 20 minutes, and upon reaching 50° C. and 150 bar, $CO_2$ was continuously injected thereto for 20 minutes at a rate of 5 L/min. At this time, the ethanol was recovered through the bottom of a separator. After 20 minutes of resting, supercritical drying was performed by continuously injecting $CO_2$ at a rate of 5 L/min over the course of 20 minutes. Thereafter, $CO_2$ was vented over the course of 2 hours, resulting in preparing a silica aerogel composite having a density of about 0.165 g/cc.

[Experimental Example 1] Volume Ratio of Fiber and Remaining Portion Per Unit Volume of Aerogel Composite The following experiment was performed on the silica aerogel composite prepared in each of Examples 1-1 to 1-8 and Comparative Examples 1-1 to 1-4, which were finally dried as described above, to confirm a volume ratio of the fibers and the remaining portion, that is, the aerogel including pores and the voids between discrete fibers.

First, aerogel composites of Examples 1-1 to 1-8 and Comparative Examples 1-1 to 1-4 prepared to have a width× length of approximately 60 cm×12 cm and a height of approximately 0.4 cm were prepared, and five rectangular parallelepiped specimens having a size of width×length of 1 cm×1 cm were obtained from each of the aerogel composites. However, at this time, the five specimens were obtained by obtaining four specimens by positioning a position, which is spaced apart by 10 cm in a center direction from each corner of the aerogel composite, at the exact center of a specimen, and obtaining one specimen by positioning the exact central portion of the aerogel composite at the exact center of a specimen as well.

Figure 2:
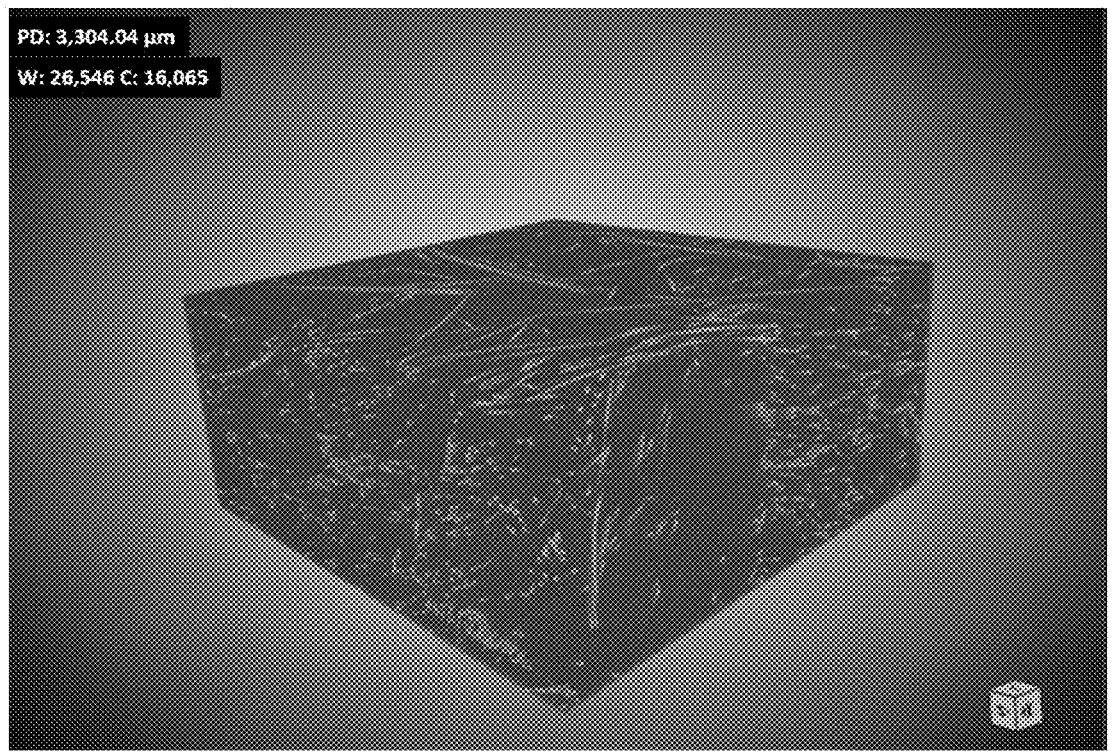
FIG. 2 illustrates an example process of distinguishing fibers and the remaining portion other than the fibers in the segmented region by contrast level using Dragonfly software.
Figure 3:
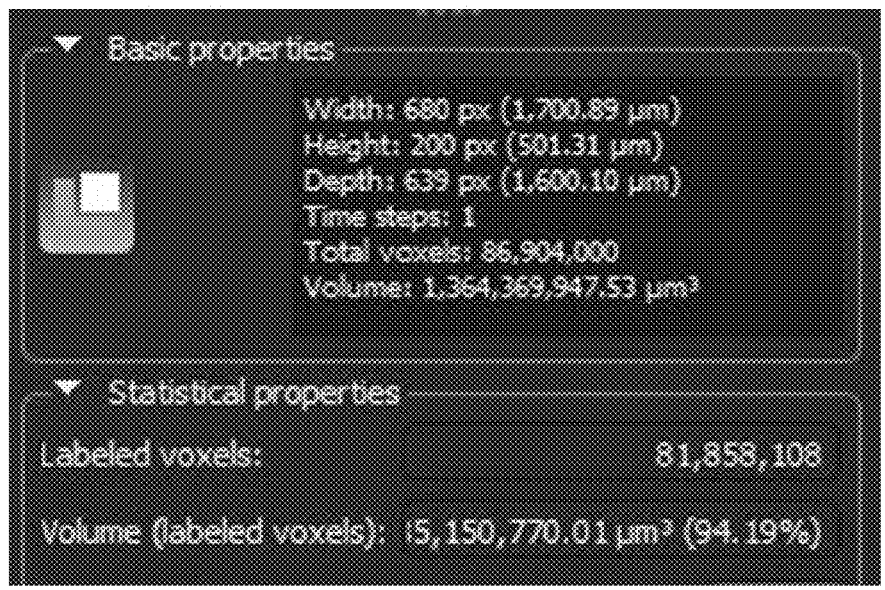
FIG. 3 illustrates an example process of calculating the volume occupancy ratio (volume ratio) of each of the fibers and the remaining portion other than the fibers using Dragonfly software.

Thereafter, the specimen is placed in a load cell by DEBEN Co., followed by assembling the load cell, and a stage portion of the device was changed to a dedicated stage capable of fixing the load cell. At this time, in-situ XRM analysis was performed using the VERSA 520 equipment of ZEISS Co., under the conditions shown in Table 1 below, and in order to confirm the volume ratio of the fibers and the aerogel including the pores and the voids in each of the aerogel composite specimens based on the results of the analysis, Dragonfly software (version 2021.3) was used. In order to facilitate understanding, the analysis method will be explained as follows with reference to FIGS. 1 to 3 showing one example process of the analysis. After activating the results of the in-situ XRM analysis with the Dragonfly software, a region to be segmented was set and extracted by adjusting the border through the Clip function (FIG. 1). At this time, the size of the segmentation region was set to be about 1700 μm×1600 μm×500 μm (width×depth×height). Within the segmented region, the fibers and the remaining portion other than the fibers were distinguished, based on contrast level, using a lower otsu function and an upper otsu function of the Dragonfly software (FIG. 2). The lower otsu function identified portions of the segmented region with lower contrast, corresponding to the portion other than the fibers, and the upper otsu function identified portions of the segmented region with higher contrast, corresponding to the fibers. The volume occupancy ratio (volume ratio) of the fibers and of the remaining portion other than the fibers was then calculated using the Dragonfly software (FIG. 3). Through the analysis, average values of volume ratios of the fibers per unit volume of the aerogel composite and volume ratios of the aerogel including pores and the voids between discrete fibers, which were measured for each of the five specimens of each of Examples and Comparative Examples, were calculated and shown in Table 2 below.

TABLE 1

| Acceleration voltage | 80 kV |
| Voxel size | 2.5 μm |
| Objective lens magnification | 4 X |
| Exposure time | 1 s/frame |
| Number of total frames | 3201 |

TABLE 2

| Classification | Volume ratio (%) of fiber per unit volume of aerogel composite | Volume ratio (%) of remaining portion other than fiber per unit volume of aerogel composite |
| --- | --- | --- |
| Example 1-1 | 8.8 | 91.2 |
| Example 1-2 | 8.4 | 91.6 |
| Example 1-3 | 9 | 91 |
| Example 1-4 | 7.7 | 92.3 |
| Example 1-5 | 7.5 | 92.5 |
| Example 1-6 | 6.9 | 93.1 |
| Example 1-7 | 10.9 | 89.1 |
| Example 1-8 | 11.4 | 88.6 |
| Comparative Example 1-1 | 19.4 | 80.6 |
| Comparative Example 1-2 | 23.8 | 76.2 |
| Comparative Example 1-3 | 26.5 | 73.5 |
| Comparative Example 1-4 | 16.2 | 83.8 |

As shown in Table 2 above, it can be seen that per unit volume of the silica aerogel composite prepared in each of Examples 1-1 to 1-8, the fiber is included in 5 vol % to 15 vol %, and the aerogel including pores and the voids between the discrete fibers are included in 85 vol % to 95 vol %.

[Experimental Example 2] Weight Ratio of Fiber and Aerogel in Aerogel Composite

The weight of the silica aerogel composite prepared in each of Examples 1-1 to 1-8 and Comparative Examples 1-1 to 1-4, which were finally dried as described above, was measured. In addition, the fiber substrate (glass fiber mat, 3 mm) in an amount used in the aerogel composite was weighed after supercritical drying was performed in the same manner as in Example 1-1. Assuming the difference between the weight of the silica aerogel composite and the weight of the fiber substrate as the weight of the aerogel, the weight ratio of the fiber substrate and the aerogel in each of Examples and Comparative Examples was calculated and shown in Table 3 below.

TABLE 3

| Classification | Weight ratio of fiber:aerogel |
| --- | --- |
| Example 1-1 | 1:0.67 |
| Example 1-2 | 1:0.81 |
| Example 1-3 | 1:1 |
| Example 1-4 | 1:1 |
| Example 1-5 | 1:0.5 |
| Example 1-6 | 1:0.5 |
| Example 1-7 | 1:0.45 |
| Example 1-8 | 1:0.375 |
| Comparative Example 1-1 | 1:0.67 |
| Comparative Example 1-2 | 1:0.3 |
| Comparative Example 1-3 | 1:0.25 |
| Comparative Example 1-4 | 1:0.375 |

As shown in Table 3 above, it can be seen that in the silica aerogel composite prepared in each of Examples 1-1 to 1-8, the fiber substrate and the aerogel are included in a weight ratio of 1:0.35 to 2.

[Experimental Example 3] Evaluation of Hydrophobicity of Aerogel Composite

1. Evaluation of Room-Temperature Hydrophobicity

The following experiments were performed to evaluate the degree of hydrophobicity on the surface and inside of the aerogel composite.

1-1. Measurement of Surface Water Repellency

First, a specimen having a size of 10 cm×10 cm (the thickness is about 5 mm) was obtained from each of Examples 1-1 to 1-8 and Comparative Examples 1-1 to 1-4, and floated on distilled water at a temperature of 21±2° C., and then, a 6.4 mm mesh screen was sunk to 127 mm below the surface of the water (impregnation). 15 minutes later, the mesh screen was removed, and when the specimen rose to the surface, the specimen was picked up with a clamp and was hung vertically for 60±5 seconds. Thereafter, the weight of the specimens before/after the impregnation were each measured to calculate the surface water repellency according to Equation 5 below. The lower the surface water repellency, the better the degree of hydrophobicity on the surface of the silica aerogel composite.

Moisture impregnation rate (wt %)={(Weight of specimen after impregnation−Weight of specimen before impregnation)/(Weight of specimen before impregnation)}×100  [Equation 5]

1-2. Measurement of Cross-Section Water Repellency

The cross-section water repellency was measured in the same manner as the surface water repellency after cutting a specimen having a size of 10 cm×10 cm into a size of 1 cm×1 cm (the thickness is about 5 mm). However, in consideration of the size of the specimens, the cross-section water repellency was represented as an average value after preparing five specimens for each of Examples and Comparative Examples and repeating the same experiment for each specimen. At this time, the average value was rounded from the third decimal place and expressed to two decimal places. Here, the lower the cross-section water repellency value, the better the degree of hydrophobicity inside the silica aerogel composite.

TABLE 4

| Classification | Surface water repellency | Cross-section water repellency |
| --- | --- | --- |
| Example 1-1 | 2.13 | 1.05 |
| Example 1-2 | 1.05 | 0.7 |
| Example 1-3 | 1.12 | 0.81 |
| Example 1-4 | 0.84 | 0.63 |
| Example 1-5 | 3.24 | 1.13 |
| Example 1-6 | 3.06 | 1.15 |
| Example 1-7 | 3.58 | 1.36 |
| Example 1-8 | 3.61 | 1.29 |
| Comparative Example 1-1 | 4.42 | 3.65 |
| Comparative Example 1-2 | 8.42 | 5.4 |
| Comparative Example 1-3 | 11.32 | 6.24 |
| Comparative Example 1-4 | 5.21 | 3.75 |

As shown in Table 4 above, it can be seen that the surface water repellency of the aerogel composites (Examples 1-1 to 1-8) according to the present disclosure is approximately 4 wt % or less, which is low, and the cross-section water repellency is also very low at 1.5 wt % or less. From the above, it can be seen that the aerogel composite according to the present disclosure has a high degree of hydrophobicity both on the surface and the inside, and has excellent water repellency.

On the contrary, it can be seen that the surface water repellency of the aerogel composites of Comparative Examples 1-1 to 1-4 is at a level of greater than 4 wt %, and the cross-section water repellency thereof is at a minimum of 3.65 wt % and at a maximum of 6.24 wt %, indicating very low water repellency, and the degree of hydrophobicity inside the aerogel composite is particularly low.

2. High-Temperature Hydrophobicity

In order to evaluate whether hydrophobicity is maintained even when the aerogel composite specimens prepared in Examples and Comparative Examples are heat-treated at a high temperature, a specimen prepared in each of Examples 1-1 to 1-8 and Comparative Examples 1-1 to 1-4 was heat-treated at 400° C. for 1 hour, and then, as shown in 1-1., floated on distilled water at a temperature of 21±2° C. to evaluate whether the specimen floats on the distilled water, and the results are shown in Table 5 below. However, in Table 5 below, O represents a case in which the specimen floats on the distilled water, or inside the distilled water, and X represents a case in which the specimen sinks to the bottom of the water tank.

TABLE 5

| Classification | Moisture impregnation rate (wt %) |
| --- | --- |
| Example 1-1 | O |
| Example 1-2 | O |
| Example 1-3 | O |
| Example 1-4 | O |
| Example 1-5 | O |
| Example 1-6 | O |
| Example 1-7 | O |
| Example 1-8 | O |
| Comparative Example 1-1 | X |
| Comparative Example 1-2 | O |
| Comparative Example 1-3 | X |
| Comparative Example 1-4 | O |

As shown in Table 5 above, it can be confirmed that all the specimens of the aerogel composites (Examples 1-1 to 1-8) according to the present disclosure float on the distilled water despite the heat treatment at high temperatures, and thus, maintain the hydrophobicity.

On the other hand, it can be confirmed that the specimens of Comparative Examples 1-1 and 1-4 did not float in the distilled water after the heat treatment, but all sank to the bottom of the water tank in which the test was performed. In the case of Comparative Example 1-2 or Comparative Example 1-4, the heat-treated specimen did not sink to the bottom of the water tank, but sank from the surface of the distilled water to about ⅓ to ½ of the depth of the water tank and floated inside the distilled water, so that it can be seen that the hydrophobicity of the specimen was not maintained but decreased due to the heat treatment.

[Experimental Example 4] Evaluation of Insulation of Aerogel Composite

In order to evaluate the surface resistance, volume resistance, and dielectric breakdown strength at room temperature of the aerogel composite prepared according to the present disclosure, a specimen having a size of 50 mm×50 mm was obtained from the aerogel composite prepared in each of Examples 1-1 to 1-8 and Comparative Examples 1-1 to 1-4, and experiments were performed according to the following methods. However, a total of five specimens were prepared in the manner in which four specimens were obtained by positioning a position, which is spaced apart by 10 cm in a center direction from each corner of an aerogel composite prepared in a rectangular shape having a size of 60 cm×12 cm, at the exact center of a specimen, and one specimen was obtained by positioning the exact central portion of the aerogel composite at the exact center of a specimen as well.

1. Surface Resistance and Volume Resistance

Under the conditions of 23±2° C. and 45±5% R.H, one surface of each aerogel composite specimen was measured for surface resistance and volume resistance while being applied with a voltage of 1,000 V for 60 seconds using a resistivity meter (Hiresta UX MCP-HT800, Mitsubishi Chemical Analytech).

2. Dielectric Breakdown Strength

Under the conditions of 23±2° C. and 45±5% R.H, each aerogel composite specimen was measured for dielectric breakdown strength in accordance with the ASTM D149 test method using AC/DC withstand voltage test equipment (6CCE100-5/D149, Phenix Technologies).

For the total five specimens, average values of the surface resistance, volume resistance, and dielectric breakdown strength measured by the above-described methods were calculated, and the results are shown in Table 6 below.

TABLE 6

|  | Surface resistance (Ω/sq) | Volume resistance (Ω · cm) | Dielectric breakdown strength (kV/mm) |
|---|---|---|---|
| Example 1-1 | $1.03 \times 10^{13}$ | $5.85 \times 10^{12}$ | 3 |
| Example 1-2 | $1.29 \times 10^{13}$ | $6.50 \times 10^{12}$ | 3.5 |
| Example 1-3 | $2.91 \times 10^{13}$ | $5.49 \times 10^{12}$ | 4.8 |
| Example 1-4 | $7.16 \times 10^{13}$ | $6.82 \times 10^{12}$ | 5 |
| Example 1-5 | $1.15 \times 10^{14}$ | $8.83 \times 10^{13}$ | 5 |
| Example 1-6 | $3.66 \times 10^{14}$ | $1.01 \times 10^{14}$ | 5.3 |
| Example 1-7 | $3.16 \times 10^{13}$ | $2.73 \times 10^{13}$ | 4.2 |
| Example 1-8 | $8.68 \times 10^{12}$ | $1.55 \times 10^{13}$ | 4 |
| Comparative Example 1-1 | $2.37 \times 10^{8}$ | $2.56 \times 10^{10}$ | 2 |
| Comparative Example 1-2 | $6.72 \times 10^{10}$ | $2.27 \times 10^{11}$ | 2.7 |
| Comparative Example 1-3 | $3.68 \times 10^{10}$ | $7.13 \times 10^{11}$ | 2.5 |
| Comparative Example 1-4 | $4.21 \times 10^{11}$ | $9.62 \times 10^{11}$ | 2.9 |

As shown in Table 6 above, it can be seen that the aerogel composites of Examples 1-1 to 1-8 according to the present disclosure have high surface resistance, high volume resistance, and also a very high level of dielectric breakdown strength compared to the aerogel composites of Comparative Examples 1-1 to 1-4, and thus, have excellent insulation. Particularly, the aerogel composite according to the present disclosure has a significant difference in surface resistance, volume resistance, and dielectric breakdown strength from that of Comparative Example 1-1 in which surface modification was not performed.

[Experimental Example 5] Evaluation of High-Temperature Insulation of Aerogel Composite The aerogel composite prepared according to the present disclosure was evaluated for the change in surface resistance at high temperatures.

1. Evaluation of Insulation Properties after 200° C. Heat Treatment

Five specimens each having a size of 50 mm×50 mm were obtained from the aerogel composite prepared in each of Examples 1-1 to 1-8 and Comparative Examples 1-1 to 1-4 in the same manner as in Experimental Example 3 above, and then heat-treated at 200° C. for 1 hour. Approximately 24 hours after the heat treatment, the five specimens were measured for surface resistance in the same manner as in Experimental Example 3, and the average value was calculated, and the results are shown in Table 6 below. In addition, in order to confirm the change in surface resistance due to the heat treatment, a $R_{200}$ value in Equation 1 below was calculated based on the surface resistance value at room temperature measured in Experimental Example 5, and the results are also shown in Table 7.

$R_{200} = \log_{10}\{$(Surface resistance of aerogel composite after heating at 200° C.)/(Surface resistance of aerogel composite before heating)$\}$ [Equation 1]

TABLE 7

|  | Room temperature Surface resistance (Ω/sq) | After 200° C. heat treatment Surface resistance (Ω/sq) | $R_{200}$ |
|---|---|---|---|
| Example 1-1 | $1.03 \times 10^{13}$ | $8.33 \times 10^{14}$ | 1.91 |
| Example 1-2 | $1.29 \times 10^{13}$ | $6.76 \times 10^{15}$ | 2.72 |
| Example 1-3 | $2.91 \times 10^{13}$ | $2.44 \times 10^{15}$ | 1.92 |
| Example 1-4 | $7.16 \times 10^{13}$ | $1.04 \times 10^{15}$ | 1.16 |
| Example 1-5 | $1.15 \times 10^{14}$ | $3.70 \times 10^{15}$ | 1.51 |
| Example 1-6 | $3.66 \times 10^{14}$ | $5.73 \times 10^{15}$ | 1.19 |
| Example 1-7 | $3.16 \times 10^{13}$ | $4.68 \times 10^{14}$ | 1.17 |
| Example 1-8 | $8.68 \times 10^{12}$ | $1.05 \times 10^{13}$ | 0.08 |
| Comparative Example 1-1 | $2.37 \times 10^{8}$ | $1.58 \times 10^{6}$ | −2.18 |
| Comparative Example 1-2 | $6.72 \times 10^{10}$ | $1.04 \times 10^{10}$ | −0.81 |
| Comparative Example 1-3 | $3.68 \times 10^{10}$ | $7.63 \times 10^{8}$ | −1.68 |
| Comparative Example 1-4 | $4.21 \times 10^{11}$ | $3.09 \times 10^{11}$ | −0.13 |

2. Evaluation of Insulation after 400° C. Heat Treatment

Five specimens each having a size of 50 mm×50 mm were obtained from the aerogel composite prepared in each of Examples 1-1 to 1-8 and Comparative Examples 1-1 to 1-4, and then heat-treated at 400° C. for 1 hour. Approximately 24 hours after the heat treatment, the surface resistance was measured in the same manner as in Experimental Example 3, and the average value for the five specimens was calculated, and the results are shown in Table 8 below. In order to confirm the change in surface resistance due to the heat treatment, a $R_{400}$ value in Equation 2 below was calculated based on the surface resistance value at room temperature measured in Experimental Example 3, and the results are also shown in Table 8.

$R_{400} = \log_{10}\{$(Surface resistance of aerogel composite after heating at 400° C.)/(Surface resistance of aerogel composite before heating)$\}$ [Equation 2]

TABLE 8

|  | Room temperature Surface resistance (Ω/sq) | After 400° C. heat treatment Surface resistance (Ω/sq) | $R_{400}$ |
|---|---|---|---|
| Example 1-1 | $1.03 \times 10^{13}$ | $6.04 \times 10^{11}$ | −1.23 |
| Example 1-2 | $1.29 \times 10^{13}$ | $8.13 \times 10^{11}$ | −1.20 |
| Example 1-3 | $2.91 \times 10^{13}$ | $4.31 \times 10^{12}$ | −0.83 |
| Example 1-4 | $7.16 \times 10^{13}$ | $1.14 \times 10^{13}$ | −0.80 |
| Example 1-5 | $1.15 \times 10^{14}$ | $2.61 \times 10^{13}$ | −0.64 |
| Example 1-6 | $3.66 \times 10^{14}$ | $3.51 \times 10^{13}$ | −1.02 |
| Example 1-7 | $3.16 \times 10^{13}$ | $9.67 \times 10^{12}$ | −0.51 |
| Example 1-8 | $8.68 \times 10^{12}$ | $7.35 \times 10^{11}$ | −1.07 |
| Comparative Example 1-1 | $2.37 \times 10^{8}$ | $1.21 \times 10^{6}$ | −2.29 |
| Comparative Example 1-2 | $6.72 \times 10^{10}$ | $1.24 \times 10^{9}$ | −1.73 |
| Comparative Example 1-3 | $3.68 \times 10^{10}$ | $5.21 \times 10^{8}$ | −1.85 |
| Comparative Example 1-4 | $4.21 \times 10^{11}$ | $1.83 \times 10^{10}$ | −1.36 |

3. Evaluation of Insulation after 600° C. Heat Treatment

Five specimens each having a size of 50 mm×50 mm were obtained from the aerogel composite prepared in each of Examples 1-1 to 1-8 and Comparative Examples 1-1 to 1-4, and then heat-treated at 600° C. for 1 hour. Approximately 24 hours after the heat treatment, the surface resistance was measured in the same manner as in Experimental Example 3, and the average value for the five specimens was calculated, and the results are shown in Table 9 below. In order to confirm the change in surface resistance due to the heat treatment, a $R_{600}$ value in Equation 3 below was calculated based on the surface resistance value at room temperature measured in Experimental Example 3, and the results are also shown in Table 9.

$R_{600}=\log_{10}${(Surface resistance of aerogel composite after heating at 600° C.)/(Surface resistance of aerogel composite before heating)}     [Equation 3]

TABLE 9

|  | Room temperature Surface resistance (Ω/sq) | After 600° C. heat treatment Surface resistance (Ω/sq) | $R_{600}$ |
|---|---|---|---|
| Example 1-1 | $1.03 \times 10^{13}$ | $6.42 \times 10^{11}$ | −1.21 |
| Example 1-2 | $1.29 \times 10^{13}$ | $9.14 \times 10^{11}$ | −1.15 |
| Example 1-3 | $2.91 \times 10^{13}$ | $1.37 \times 10^{12}$ | −1.33 |
| Example 1-4 | $7.16 \times 10^{13}$ | $2.16 \times 10^{12}$ | −1.52 |
| Example 1-5 | $1.15 \times 10^{14}$ | $8.00 \times 10^{11}$ | −2.16 |
| Example 1-6 | $3.66 \times 10^{14}$ | $2.37 \times 10^{12}$ | −2.19 |
| Example 1-7 | $3.16 \times 10^{13}$ | $6.01 \times 10^{11}$ | −1.72 |
| Example 1-8 | $8.68 \times 10^{12}$ | $3.30 \times 10^{11}$ | −1.42 |
| Comparative Example 1-1 | $2.37 \times 10^{8}$ | $3.71 \times 10^{5}$ | −2.81 |
| Comparative Example 1-2 | $6.72 \times 10^{10}$ | $1.59 \times 10^{7}$ | −3.63 |
| Comparative Example 1-3 | $3.68 \times 10^{10}$ | $7.49 \times 10^{6}$ | −3.69 |
| Comparative Example 1-4 | $4.21 \times 10^{11}$ | $1.01 \times 10^{9}$ | −2.62 |

As shown in Table 7 above, it has been confirmed that the aerogel composites of Examples 1-1 to 1-8 according to the present disclosure have increased surface resistance when heat-treated at a temperature of 200° C. compared to the surface resistance before the heat treatment. However, when the aerogel composites of Comparative Examples 1-1 to 1-4 were heat-treated at 200° C., the surface resistance thereof was significantly decreased compared to the surface resistance before the heat treatment. This is presumed to be due to the fact that the aerogel composite according to the present disclosure maintains high hydrophobicity even when heat-treated at 200° C., and that moisture remaining in the aerogel composite is rather removed, resulting in the increase in the surface resistance after the 200° C. heat treatment.

As shown in Tables 8 and 9 above, the aerogel composites of Examples 1-1 to 1-8 according to the present disclosure have surface resistance maintained at a high level of $1 \times 10^{11}$ Ω/sq or greater even after heat-treated at a high temperature of 400° C. or 600° C., whereas the aerogel composites of Comparative Examples 1-1 to 1-4 have significantly decreased surface resistance when heat-treated at a high temperature of 400° C. or 600° C.

From the above, it can be seen that the aerogel composite according to the present disclosure has insulation properties maintained or improved at 200° C., and has a low insulation decrease rate and maintains the insulation properties at a high level even when heat-treated at a high temperature of 400° C. or 600° C.

[Experimental Example 6] Evaluation of Heat Insulation Properties of Aerogel Composite In order to evaluate the thermal conductivity of the aerogel composite prepared according to the present disclosure, the thermal conductivity of the aerogel composite prepared in each of Examples and Comparative Examples was measured using the HFM436 equipment by Netzsch Co., and the results are shown in Table 10 below.

TABLE 10

| Classification | Thermal conductivity (mW/mK) |
|---|---|
| Example 1-1 | 25.1 |
| Example 1-2 | 23.7 |
| Example 1-3 | 20.4 |
| Example 1-4 | 18.0 |
| Example 1-5 | 15.7 |
| Example 1-6 | 16.8 |
| Example 1-7 | 18.2 |
| Example 1-8 | 19.3 |
| Comparative Example 1-1 | 32.1 |
| Comparative Example 1-2 | 28.2 |
| Comparative Example 1-3 | 28.9 |
| Comparative Example 1-4 | 22.3 |

As shown in Table 10 above, it can be seen that the aerogel composites (Examples 1-1 to 1-8) according to the present disclosure have lower thermal conductivity and better heat insulation properties than the aerogel composites of Comparative Examples 1-1 to 1-4.

[Examples 2-1 to 2-8 and Comparative Examples 2-1 to 2-4] Preparation of Heat Insulation Member To both surfaces of the aerogel composite prepared in each of Examples 1-1 to 1-8, and Comparative Examples 1-1 to 1-4, a ALKYN-1505(C) product by ALKYNES Co., in which a 25 μm-thick acrylic adhesive was applied to one surface of a 25 μm-thick PET film, was attached to prepare a heat insulation member.

[Experimental Example 7] Evaluation of Insulation of Heat Insulation Member

In order to evaluate the surface resistance, volume resistance, and dielectric breakdown strength at room temperature of the heat insulation member prepared according to the present disclosure, five specimens each having a size of 50 mm×50 mm were obtained from the heat insulation member prepared in each of Examples 2-1 to 2-8 and Comparative Examples 2-1 to 2-4 in the same manner as in Experimental Example 5, and measured for surface resistance, volume resistance, and dielectric breakdown strength, and each average value is shown in Table 11 below.

TABLE 11

|  | Surface resistance (Ω/sq) | Volume resistance (Ω · cm) | Dielectric breakdown strength (kV/mm) |
|---|---|---|---|
| Example 2-1 | $6.26 \times 10^{12}$ | $2.28 \times 10^{13}$ | 4.0 |
| Example 2-2 | $6.30 \times 10^{12}$ | $3.26 \times 10^{13}$ | 4.1 |
| Example 2-3 | $1.30 \times 10^{13}$ | $3.32 \times 10^{13}$ | 4.2 |
| Example 2-4 | $1.48 \times 10^{13}$ | $3.44 \times 10^{13}$ | 4.0 |
| Example 2-5 | $8.16 \times 10^{13}$ | $6.31 \times 10^{13}$ | 5.0 |
| Example 2-6 | $2.07 \times 10^{14}$ | $1.93 \times 10^{14}$ | 6.0 |
| Example 2-7 | $7.60 \times 10^{13}$ | $8.02 \times 10^{13}$ | 5.1 |
| Example 2-8 | $5.46 \times 10^{12}$ | $3.50 \times 10^{13}$ | 4.3 |
| Comparative | $1.18 \times 10^{8}$ | $3.42 \times 10^{10}$ | 2.1 |

TABLE 11-continued

|  | Surface resistance (Ω/sq) | Volume resistance (Ω · cm) | Dielectric breakdown strength (kV/mm) |
|---|---|---|---|
| Example 2-1 |  |  |  |
| Comparative Example 2-2 | $5.24 \times 10^{10}$ | $4.08 \times 10^{11}$ | 2.5 |
| Comparative Example 2-3 | $2.10 \times 10^{10}$ | $9.13 \times 10^{11}$ | 2.4 |
| Comparative Example 2-4 | $8.82 \times 10^{11}$ | $9.12 \times 10^{11}$ | 3.8 |

As shown in Table 11 above, it can be seen that the heat insulation members of Examples 2-1 to 2-8 according to the present disclosure have high surface resistance, high volume resistance, and also a very high level of dielectric breakdown strength compared to the heat insulation members of Comparative Examples 2-1 to 2-4, and thus, have excellent insulation.

[Examples 3-1 and 3-2] Preparation of Heat Insulation Member

In order to evaluate the surface resistance, volume resistance, and dielectric breakdown strength at room temperature of the heat insulation member prepared according to the present disclosure, a ALKYN-4005(FR) product by ALKYNES Co., in which a 25 μm-thick acrylic adhesive was applied to one surface of a 25 μm-thick flame retardant PET film, was attached to both surfaces of the aerogel composite of Example 1-1 to prepare a heat insulation member of Example 3-1.

In addition, to both surfaces of the aerogel composite of Example 1-1, a ALKYN-4004D(PS) product by ALKYNES Co., in which a 7 μm-thick polyester film and a 12 μm-thick PET film were sequentially stacked, and a 25 μm-thick acrylic adhesive was applied on the other side of the polyester film, was attached to prepare a heat insulation member of a heat insulation member of Example 3-2.

[Experimental Example 8] Evaluation of Insulation of Heat Insulation Member

In order to evaluate the surface resistance, volume resistance, and dielectric breakdown strength at room temperature of the heat insulation member prepared according to the present disclosure, five specimens each having a size of 50 mm×50 mm were obtained from the heat insulation member prepared in each of Example 2-1, and Examples 3-1 and 3-2 in the same manner as in Experimental Example 3, and measured for surface resistance, volume resistance, and dielectric breakdown strength, and each average value is shown in Table 12 below.

TABLE 12

|  | Surface resistance (Ω/sq) | Volume resistance (Ω · cm) | Dielectric breakdown strength (kV/mm) |
|---|---|---|---|
| Example 2-1 | $6.2 \times 10^{12}$ | $2.28 \times 10^{13}$ | 4.0 |
| Example 3-1 | $5.18 \times 10^{12}$ | $2.42 \times 10^{13}$ | 4.3 |
| Example 3-2 | $1.06 \times 10^{13}$ | $3.68 \times 10^{13}$ | 4.1 |

As shown in Table 12 above, the heat insulation members of Example 2-1, and Examples 3-1 and 3-2 according to the present disclosure allhave high surface resistance, high volume resistance, and also a very high level of dielectric breakdown strength even if the thickness of the adhesive layer or the configuration of the support member is changed. From the above, it can be seen that excellent insulation properties of the heat insulation member according to the present disclosure is caused by the aerogel composite, and that the heat insulation member of the present disclosure has excellent insulation even if the structure or composition of the support member or the adhesive layer is changed.

An aerogel composite provided in the present disclosure has excellent insulation properties, and particularly, maintains an excellent level of insulation properties even when exposed to a high-temperature environment, and thus, is suitable for application as an insulation material to a battery module of an electric vehicle and the like.

What is claimed is:

1. An aerogel composite comprising:
a fiber substrate; and
aerogel including one or more pores,
wherein:
a surface resistance at room temperature (23±2° C.) of the aerogel composite is $1 \times 10^{12}$ Ω/sq to $1 \times 10^{16}$ Ω/sq;
a surface resistance measured after heating the aerogel composite at a temperature of 200° C. for 1 hour is $1 \times 10^{12}$ Ω/sq to $1 \times 10^{16}$ Ω/sq; and
the aerogel composite has $R_{200}$, which is a real number of 0 to 4, in Equation 1 below:

$R_{200}=\log_{10}\{$(Surface resistance of aerogel composite after heating at 200° C. for 1 hour)/(Surface resistance of aerogel composite before heating)$\}$ [Equation 1].

2. The aerogel composite of claim 1, wherein a volume resistance at room temperature (23±2° C.) of the aerogel composite is $1 \times 10^{12}$ Ω/sq to $1 \times 10^{16}$ Ω/sq.

3. The aerogel composite of claim 1, wherein a dielectric breakdown strength at room temperature (23±2° C.) of the aerogel composite is 3 kV/mm to 30 kV/mm.

4. The aerogel composite of claim 1, wherein the aerogel composite has $R_{400}$, which is a real number of −1.3 to 0, in Equation 2 below:

$R_{400}=\log_{10}\{$(Surface resistance of aerogel composite after heating at 400° C. for 1 hour)/(Surface resistance of aerogel composite before heating)$\}$ [Equation 2].

5. The aerogel composite of claim 1, wherein the surface resistance measured after heating the aerogel composite at a temperature of 400° C. for 1 hour is $1 \times 10^{11}$ Ω/sq to $1 \times 10^{15}$ Ω/sq.

6. The aerogel composite of claim 1, wherein the aerogel composite has $R_{600}$, which is a real number of −2.6 to 0, in Equation 3 below:

$R_{600}=\log_{10}\{$(Surface resistance of aerogel composite after heating at 600° C.)/(Surface resistance of aerogel composite before heating)$\}$ [Equation 3].

7. The aerogel composite of claim 1, wherein the surface resistance measured after heating the aerogel composite at a temperature of 600° C. for 1 hour is $1 \times 10^{10}$ Ω/sq to $1 \times 10^{14}$ Ω/sq.

8. The aerogel composite of claim 1, wherein the aerogel composite has R 600/400, which is a real number of −1.8 to 1, in Equation 4 below:

$R_{600/400}=\log_{10}\{$(Surface resistance of aerogel composite after heating at 600° C.)/(Surface resistance of aerogel composite after heating at 400° C.)$\}$ [Equation 4].

9. The aerogel composite of claim 1, wherein the aerogel composite has a moisture impregnation rate (wt %) of 4 wt % or less, which is represented by Equation 5 below:

Moisture impregnation rate (wt %) {(Weight of specimen after impregnation−Weight of specimen before impregnation)/(Weight of specimen before impregnation)}×100     [Equation 5]

wherein in Equation 5 above, a weight of a specimen after impregnation means a weight measured after impregnating an aerogel composite specimen in distilled water at 21±2° C. for 15 minutes.

10. The aerogel composite of claim 1, wherein in the aerogel composite, the fiber substrate and the aerogel are included in a weight ratio of 1:0.35 to 2.

11. The aerogel composite of claim 1, wherein a volume ratio of the aerogel including pores and voids between discrete fibers per unit volume of the aerogel composite is 85% to 98%.

12. The aerogel composite of claim 1, wherein a volume ratio of the fibers per unit volume of the aerogel composite is 2% to 15%.

13. The aerogel composite of claim 1, wherein a volume ratio of the aerogel including pores and voids between discrete fibers per unit volume of the aerogel composite after heating the aerogel composite at a temperature of 200° C. for 1 hour is 0.8 times to 1.5 times the volume ratio of the aerogel including pores and voids between discrete fibers per unit volume of the aerogel composite before the heating.

14. The aerogel composite of claim 1, wherein the aerogel is silica aerogel.

15. The aerogel composite of claim 1, wherein the fiber substrate is a glass fiber substrate.

16. The aerogel composite of claim 1, wherein a density of the aerogel composite is 0.05 g/cm$^3$ to 0.30 g/cm$^3$.

17. A heat insulation member comprising:
an aerogel composite of claim 1; and
a support member positioned on at least one surface of both surfaces of the aerogel composite.

18. The heat insulation member of claim 17, wherein the surface resistance at room temperature (23±2° C.) of the heat insulation member is $1\times10^{12}$ Ω/sq to $1\times10^{15}$ Ω/sq, and the volume resistance thereof is $1\times10^{12}$ Ωcm to $1\times10^{16}$ Ωcm.

19. The heat insulation member of claim 17, wherein the dielectric breakdown strength at room temperature (23±2° C.) of the heat insulation member is 3 kV/mm to 30 kV/mm.

* * * * *